(12) United States Patent
Nakamura

(10) Patent No.: US 11,393,234 B2
(45) Date of Patent: Jul. 19, 2022

(54) IMAGE PROCESSING SYSTEM FOR COMPUTERIZING DOCUMENT, CONTROL METHOD THEREOF, AND STORAGE MEDIUM

(71) Applicant: CANON KABUSHIKI KAISHA, Tokyo (JP)

(72) Inventor: Shun Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/148,229

(22) Filed: Jan. 13, 2021

(65) Prior Publication Data
US 2021/0224531 A1    Jul. 22, 2021

(30) Foreign Application Priority Data

Jan. 21, 2020 (JP) .............................. JP2020-007505
Apr. 20, 2020 (JP) .............................. JP2020-074626

(51) Int. Cl.
| | |
|---|---|
| *G06V 30/41* | (2022.01) |
| *G06V 30/413* | (2022.01) |
| *H04N 1/00* | (2006.01) |
| *G06V 30/10* | (2022.01) |

(52) U.S. Cl.
CPC ....... *G06V 30/413* (2022.01); *H04N 1/00795* (2013.01); *G06V 30/10* (2022.01); *H04N 2201/0094* (2013.01)

(58) Field of Classification Search
CPC ........... G06K 9/00456; G06K 2209/01; G06K 9/00463; H04N 1/00795; H04N 2201/0094
USPC ........................................................ 382/176
See application file for complete search history.

(56) References Cited

U.S. PATENT DOCUMENTS

2016/0337538 A1* 11/2016 Tamura ............... H04N 1/00411
2019/0230232 A1*  7/2019 Soga .................... H04N 1/0044
2019/0303701 A1* 10/2019 Kazu .................... G06F 40/205

FOREIGN PATENT DOCUMENTS

JP         2019-128715         8/2019

* cited by examiner

*Primary Examiner* — Neil R McLean
(74) *Attorney, Agent, or Firm* — Venable LLP

(57) ABSTRACT

In a case where setting of a file name is performed for a scanned image by using OCR processing results of the scanned image, it is made possible to perform OCR processing for text blocks having a strong possibility of being set as a file name.

10 Claims, 32 Drawing Sheets

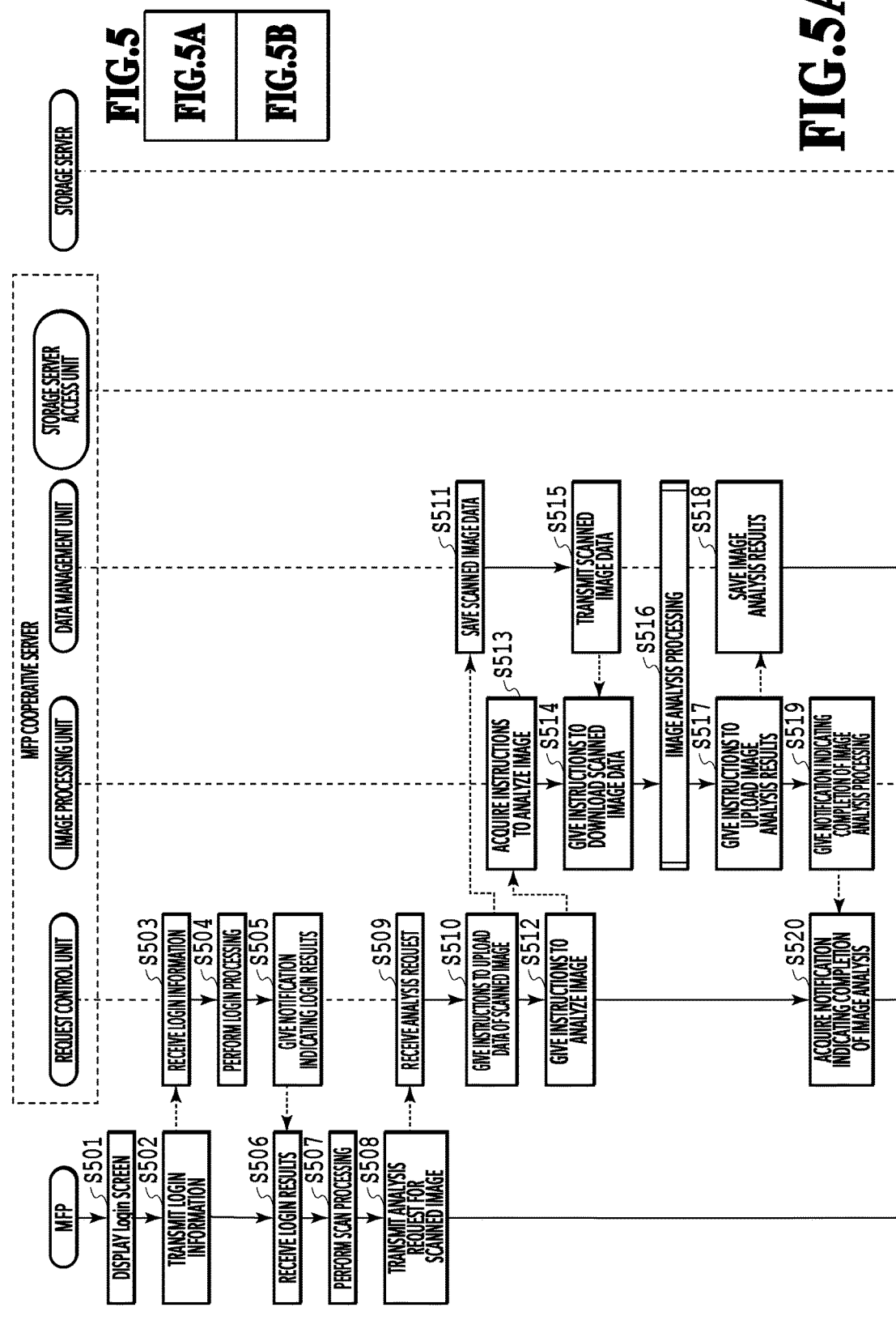

FIG.9A

```
{
"processId" : "00039000-5555-3f33-5552-6999c30bcccc"
}
```

FIG.9B

```
{
"status" : "processing"
}
```

FIG.9C

```
{
"status" : "completed",
"ocrResultUrl" : "https://mfpservice/output-images/00039000-5555-3f33-5552-6999c30bcccc/ocrResult.json",
"matchingResultUrl" : "https://mfpservice/output-images/00039000-5555-3f33-5552-6999c30bcccc/matchingResult.json",
"formKeys" : [
    {
        "key" : "filename",
        "keyType" : "filename",
        "value" : "",
        "type" : "string",
        "displayName" : "filename",
        "required" : true,
        "multiSelect" : true,
        "separator" : "-",
        "autoInput" : true
    }
]
}
```

Estimate form

〒100-9999  
   B-B-B Minato-ku, Tokyo  
Shinagawa Inc. To

Estimate No. : R12-3456  
Date of issuance : 2017/09/10

| Item | Unit price | Quantity | Amount |
|---|---|---|---|
| GF-1544 | 11,550 | 3 | 34,650 |
| EF24-70 | 134,100 | 1 | 134,100 |
|  |  |  |  |
|  |  |  |  |
|  |  | Total | 168,750 |

Kawasaki Inc.  
〒200-1111  
   2-2-200 Yokohama-shi,  
   Kanagawa prefecture

FIG.11

BLOCK SELECTION RESULTS

```
{
    "imageWidth": 2490,
    "imageHeight": 3515,
    "regions": [
        {
            "rect": {
                "x": 1019,
                "y": 303,
                "width": 489,
                "height": 95
            },
            "text": ""
        },
        {
            "rect": {
                "x": 261,
                "y": 446,
                "width": 243,
                "height": 43
            },
            "text": ""
        },
        {
            "rect": {
                "x": 1584,
                "y": 446,
                "width": 262,
                "height": 36
            },
            "text": ""
        },
        {
            "rect": {
                "x": 1874,
                "y": 443,
                "width": 230,
                "height": 47
            },
            "text": ""
        }
        ⋮
        ※ ELEMENTS CORRESPONDING TO THE NUMBER OF CHARACTER AREAS ARE ADDED TO "regions"
        ⋮
    ]
}
```

FIG.12

Estimate form

〒100-9999
A-A-A Ohta-ku, Tokyo
Shimomaruko Inc. To

Estimate No. : R12-3500
Date of issuance : 2017/09/29

| Item | Unit price | Quantity | Amount |
|---|---|---|---|
| GF-1555 | 10,000 | 2 | 20,000 |
|  |  |  |  |
|  |  |  |  |
|  |  |  |  |
|  |  | Total | 20,000 |

Kawasaki Inc.
〒200-1111
2-2-200 Yokohama-shi,
Kanagawa prefecture

FIG.13

SIMILAR BUSINESS FORM DETERMINATION RESULTS

```
{
    "matched": true,
    "formId": "aaaaaaaa-ffff-49ab-acf8-55558888eeee",
    "matchingScore": 0.74582005269911589,
    "rectInfoArray": [
        {
            "key": "fileRegion0",
            "region": {
            "rect": {
            "x": 1019,
            "y": 303,
            "width": 489,
            "height": 95
            },
            "text": ""
        }
        },
        {
            "key": "fileRegion1",
            "region": {
            "rect": {
            "x": 406,
            "y": 626,
            "width": 594,
            "height": 71
            },
            "text": ""
        }
        }
    ],
    "metadataArray": [
        {
            "key": "filename",
            "keyType": "filename",
            "value": [
            "fileRegion0",
            "separator",
            "fileRegion1"
            ]
        }
    ]
}
```

FIG.14

FILE NAME SETTING CANDIDATE INFORMATION

```
{
    "matched": true,
    "formId": "aaaaaaaa-ffff-49ab-acf8-55558888eeee",
    "matchingScore": 0.74582005269911589,
    "rectInfoArray": [
        {
            "key": "fileRegion0",
            "region": {
            "rect": {
            "x": 1019,
            "y": 303,
            "width": 489,
            "height": 95
            },
            "text": "Estimate form"
        },
        {
            "key": "fileRegion1",
            "region": {
            "rect": {
            "x": 406,
            "y": 626,
            "width": 594,
            "height": 71
            },
            "text": "Shinagawa Inc."
        }
    ],
    "metadataArray": [
        {
            "key": "filename",
            "keyType": "filename",
            "value": [
            "fileRegion0",
            "separator",
            "fileRegion1"
            ]
        }
    ]
}
```

FIG.15

Estimate form

〒100-9999  
B-B-B Minato-ku, Tokyo  
Shinagawa Inc. To

Estimate No. : R78-9012  
Date of issuance : 2017/09/29

| Item | Unit price | Quantity | Amount |
|---|---|---|---|
| GF-1544 | 11,550 | 3 | 34,650 |
| EF24-70 | 134,100 | 1 | 134,100 |
| SD-256 | 11,500 | 1 | 11,500 |
| MKFU-1128 | 51,100 | 2 | 102,200 |
|  |  | Total | 282,450 |

Kawasaki Inc.  
〒200-1111  
2-2-200 Yokohama-shi,  
Kanagawa prefecture

FIG.16

OCR RESULTS

```
{
    "imageWidth": 2490,
    "imageHeight": 3515,
    "regions": [
        {
            "rect": {
                "x": 1019,
                "y": 303,
                "width": 489,
                "height": 95
            },
            "text": "Estimate form"
        },
        {
            "rect": {
                "x": 261,
                "y": 446,
                "width": 243,
                "height": 43
            },
            "text": ""
        },
...
        {
            "rect": {
                "x": 255,
                "y": 531,
                "width": 798,
                "height": 47
            },
            "text": "B-B-B Minato-ku, Tokyo"
        },
...
        {
            "rect": {
                "x": 406,
                "y": 626,
                "width": 594,
                "height": 71
            },
            "text": "Shinagawa Inc."
        },
...
        {
            "rect": {
                "x": 972,
                "y": 2770,
                "width": 581,
                "height": 72
            },
            "text": "Kawasaki Inc."
        },
        {
            "rect": {
                "x": 1167,
                "y": 2925,
                "width": 615,
                "height": 43
            },
            "text": ""
        },
    ]
}
```

FIG.17

File name setting — 1800

1801
1803 ×

1802

Estimate form

〒100-9999
B-B-B Minato-ku, Tokyo
Shinagawa Inc. To

Estimate No. : R12-3456
Date of issuance : 2017/09/10

1806 ⤶
1804 +
1805 −

| Item | Unit price | Quantity | Amount |

1807 Transmit

FIG.18

File name setting

Estimate form _ R12-3456  ✕

Estimate form

〒100-9999
B-B-B Minato-ku, Tokyo
Shinagawa Inc. To

Estimate No. : R12-3456
Date of issuance : 2017/09/10

| Item | Unit price | Quantity | Amount |

Transmit

FIG.23

FILE NAME SETTING REQUEST

```
{
    "processId": "00039000-5555-3f33-5552699c30bcccc",
    "rectInfoArray": [
        {
            "key": "fileRegion0",
            "region": {
                "rect": {
                    "x": 1019,
                    "y": 303,
                    "width": 489,
                    "height": 95
                },
                "text": ""
            }
        },
        {
            "key": "fileRegion1",
            "region": {
                "rect": {
                    "x": 406,
                    "y": 626,
                    "width": 594,
                    "height": 71
                },
                "text": ""
            }
        }
    ],
    "metadataArray": [
        {
            "key": "filename",
            "keyType": "filename",
            "value": [
                "fileRegion0",
                "separator",
                "fileRegion1"
            ]
        }
    ]
}
```

FIG.24

| FORMID | TEXT BLOCK FOR EACH BUSINESS FORM FORMAT | TEXT BLOCK USED AS FILE NAME |
|---|---|---|
| 111111 | | + |
| 222222 | | + |
| 333333 | | + |

FIG.26

OCR RESULTS

```
{
    "isFullOcrCompleted": true,    ⟵ 2901
    "imageWidth": 2490,
    "imageHeight": 3515,
    "regions": [
        {
            "rect": {
                "x": 1019,
                "y": 303,
                "width": 489,
                "height": 95
            },
            "text": " Estimate form"
        },
        {
            "rect": {
                "x": 255,
                "y": 531,
                "width": 798,
                "height": 47
            },
            "text": " B-B-B Minato-ku, Tokyo"
        },
        {
            "rect": {
                "x": 406,
                "y": 626,
                "width": 594,
                "height": 71
            },
            "text": " Shinagawa Inc."
        },
        {
            "rect": {
                "x": 972,
                "y": 2770,
                "width": 581,
                "height": 72
            },
            "text": " Kawasaki Inc."
        },
        . . .
    ]
}
```

FIG.29

IMAGE PROCESSING SYSTEM FOR COMPUTERIZING DOCUMENT, CONTROL METHOD THEREOF, AND STORAGE MEDIUM

BACKGROUND OF THE INVENTION

Field of the Invention

The present disclosure relates to a control technique of OCR processing for a scanned image of a document.

Description of the Related Art

Conventionally, as a document management method, a method is widely made use of, which converts a scanned image obtained by reading a document with a scanner into a file in a predetermined format and transmits the file to a storage server on a network and saves the file therein. In order to transmit a scanned image to a storage server on a network as a file, it is necessary to attach a file name. As a method of setting a file name, there is a method of extracting character information by performing the OCR processing for a scanned image and selecting a character string that is used as a file name from the obtained character information. At this time, in a case where the OCR processing is performed for the entire scanned image, there is such a problem that many calculation resources are necessary and a long time is required for the processing. In this regard, as a method of implementing a reduction in time required for the OCR processing, there is a method of Japanese Patent Laid-Open No. 2019-128715. In the method of Japanese Patent Laid-Open No. 2019-128715, first, arrangement information on a character area (text block) in a document scanned in the past and information on a text block of a character string used as a file name thereof are associated with each other and accumulated as learning data. Then, at the time of computerizing a document anew, the arrangement information on the text block of the scanned image is acquired and a similar document whose arrangement of the text block is similar is searched for by collating the arrangement information with the accumulated learning data. In a case where a similar document is found, the OCR processing is performed only for the text block corresponding to the text block used as the file name of the scanned image of the similar document. By the method such as this, an attempt is made to reduce the OCR processing time.

With the method of Japanese Patent Laid-Open No. 2019-128715, it is possible to reduce the OCR processing time in a case where a similar document to which a file name was attached in the past exists. However, in a case where no similar document exists, it is necessary to perform the OCR processing for the entire scanned image of the processing-target document. That is, in a case where the scanned image of a document in a new format is taken as a target, it is not possible to reduce the OCR processing time by the method of Japanese Patent Laid-Open No. 2019-128715 described above.

The present disclosure has been made in view of the above-described problem and an object is to make it possible to perform the OCR processing only for the text blocks of the requisite minimum even in a case where no similar document was computerized in the past.

SUMMARY OF THE INVENTION

The image processing system that computerizes a document according to the present disclosure comprises a memory that stores a program; and a processor that executes the program to perform: detecting a text block from a scanned image of a target document; character recognition processing for at least one of the detected text block; and setting a property relating to the scanned image by using a character string recognized by the character recognition processing, and in a case where a document similar to the target document does not exist among computerized documents for which the computerization was performed in the past, the character recognition processing is performed for text blocks whose size is larger than or equal to a predetermined size among the detected text blocks.

Further features of the present invention will become apparent from the following description of exemplary embodiments with reference to the attached drawings.

BRIEF DESCRIPTION OF THE DRAWINGS

FIG. 9A is a diagram showing an example of a request ID and FIG. 9B and FIG. 9C are each a diagram showing an example of a response to an inquiry about a processing situation;

FIG. 11 is a diagram showing an example of a scanned image;

FIG. 12 is a diagram showing an example of results of block selection processing;

FIG. 13 is a diagram showing an example of a scanned image;

FIG. 14 is a diagram showing an example of results of similar business form determination processing;

FIG. 15 is a diagram showing an example of file name setting candidate information;

FIG. 16 is a diagram showing an example of a scanned image;

FIG. 17 is a diagram showing an example of results of OCR processing;

FIG. 18 is a diagram showing an example of a File name setting screen;

FIG. 23 is a diagram showing an example of the File name setting screen;

FIG. 24 is a diagram showing an example of a file name setting request;

FIG. 26 is a diagram showing an outline of a data structure of learning data;

FIG. 29 is a diagram showing an example of results of the OCR processing according to the modification example 2;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration>

Figure 1:
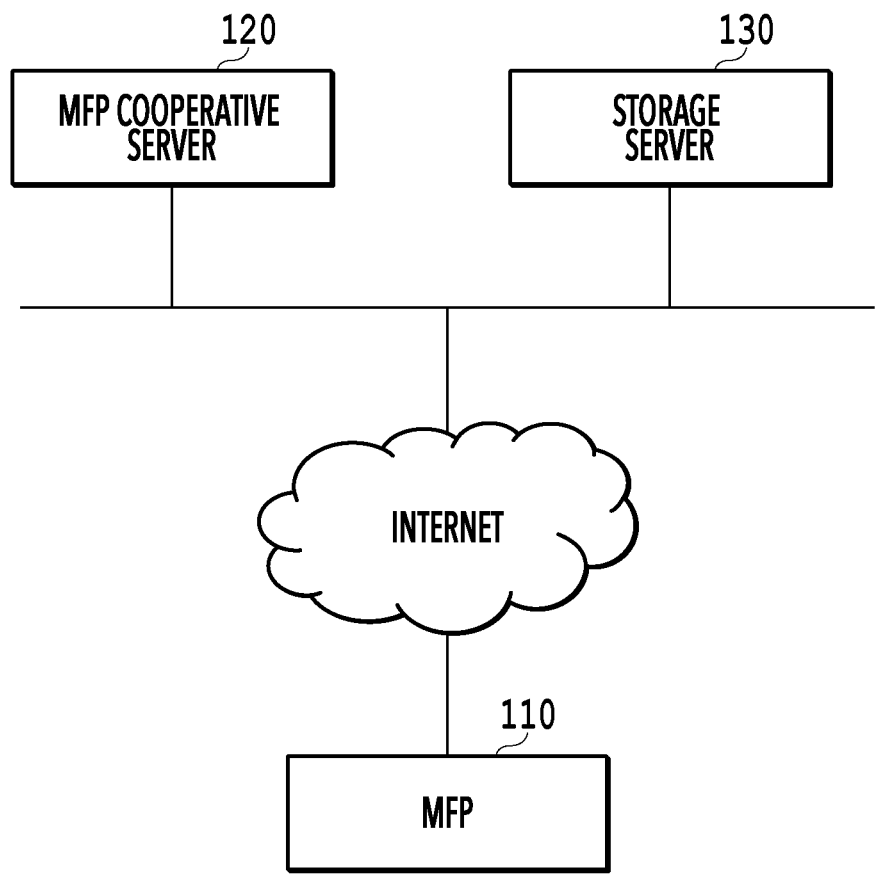
FIG. 1 is a diagram showing an entire configuration of an image processing system.

FIG. 1 is a diagram showing the entire configuration of an image processing system according to the present embodiment. The image processing system includes an MFP (Multifunction Peripheral) 110 and server apparatuses 120 and 130 providing cloud services on the internet. The MFP 110 is connected with the server apparatuses 120 and 130 so as to be capable of communication via the internet.

The MFP 110 is an example of an information processing apparatus having the scan function. The MFP 110 is a multifunction peripheral having a plurality of functions, such as the print function and the BOX save function, in addition to the scan function. Both the server apparatuses 120 and 130 are each an example of an information processing apparatus providing cloud services. The server apparatus 120 of the present embodiment provides cloud services to perform an image analysis for a scanned image received from the MFP 110, transfer a request from the MFP 110 to the server apparatus 130 providing other services, and so on. In the following, the cloud service provided by the server apparatus 120 is called "MFP cooperative service". The server apparatus 130 provides cloud services (hereinafter, called "storage services") to save a file sent via the internet, provide a saved file in response to a request from a web browser of a mobile terminal or the like (not shown schematically), and so on. In the present embodiment, the server apparatus 120 that provides the MFP cooperative service is called "MFP cooperative server" and the server apparatus 130 that provides the storage service is called "storage server"

The configuration of the image processing system 100 shown in FIG. 1 is an example and the configuration is not limited to this. For example, the MFP 110 may also have the function of the MFP cooperative server 120. Further, the MFP cooperative server 120 may be connected with the MFP 110 via a LAN (Local Area Network) in place of the internet. Furthermore, it may also be possible to apply the present embodiment to a scene in which a scanned image of a document is transmitted by being attached to a mail by replacing the storage server 130 with a mail server that performs the mail distribution service.

<Hardware Configuration of MFP>

Figure 2:
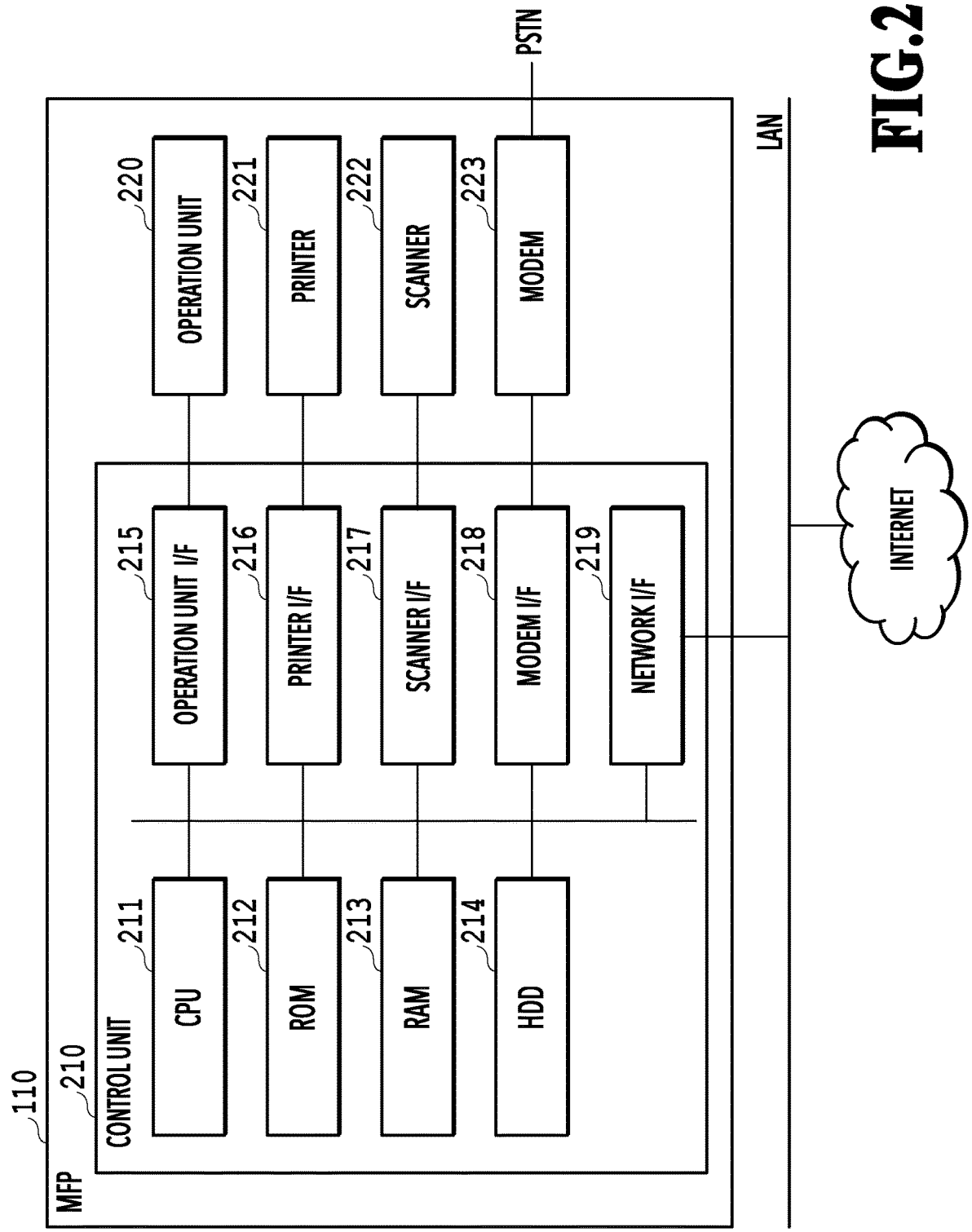
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 221, a scanner unit 222, and a modem 223. The control unit 210 includes each of units 211 to 219 below and controls the operation of the entire MFP 110. The CUP 211 reads a variety of control programs (programs corresponding to various functions shown in a software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in a flowchart, to be described later, by using the one memory (RAM 213 or HDD 214), but the present embodiment is not limited to this. For example, it may also be possible to perform each piece of processing by causing a plurality of CPUs and a plurality of RAMs or HDDs to cooperate with one another. The HDD 214 is a large-capacity storage unit configured to store image data and various programs. The operation unit I/F 215 is an interface that connects the operation unit 220 and the control unit 210. The operation unit 220 is provided with a touch panel and a keyboard and receives operations/inputs/instructions by a user. The touch operation to the touch panel includes the operation by a human finger and the operation by a touch pen. The printer I/F 216 is an interface that connects the printer unit 221 and the control unit 210. Image data to be printed is transferred from the control unit 210 to the printer unit 221 via the printer I/F 216 and printed on a printing medium, such as paper. The scanner I/F 217 is an interface that connects the scanner unit 222 and the control unit 210. The scanner unit 222 generates scanned image data by optically reading a document that is set on a document table or ADF (Auto Document Feeder), not shown schematically, and inputs the scanned image data to the control unit 210 via the scanner I/F 217. It is possible to print (copy and output) the scanned image data generated by the scanner unit 222 in the printer unit 221, save the data in the HDD 214, transmit the data to an external apparatus, such as the MFP cooperative server 120, as a file via a LAN, and so on. The modem I/F 218 is an interface that connects the modem 223 and the control unit 210. The modem 223 performs facsimile communication of image data with a facsimile device (not shown schematically) on the PSTN. The network I/F 219 is an interface that connects the control unit 210 (MFP 110) to a LAN. The MFP 110 transmits scanned image data to the MFP cooperative server 120, receives various kinds of data from the MFP cooperative server 120, and so on, by using the network I/F 219. The hardware configuration of the MFP 110 explained above is an example and the hardware configuration may comprise another configuration as needed or may not have a part of the configuration.

<Hardware Configuration of Server Apparatus>

Figure 3:
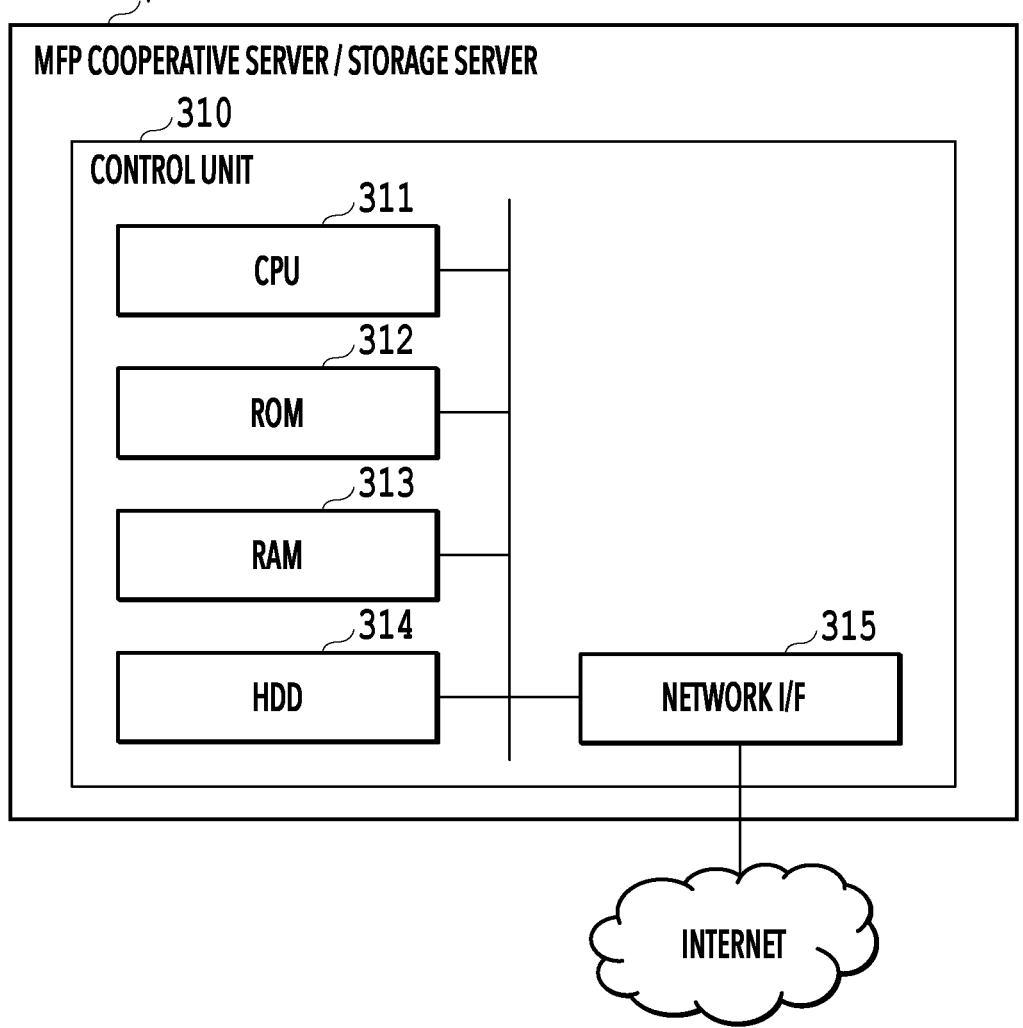
FIG. 3 is a block diagram showing a hardware configuration of an MFP cooperative server and a storage server.

FIG. 3 is a block diagram showing the hardware configuration of the MFP cooperative server 120/the storage server 130. The MFP cooperative server 120 and the storage server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the storage server 130 receive requests for various kinds of processing from other apparatuses (MFP 110 and the like) via the network I/F 315 and return processing results in accordance with the requests.

<Software Configuration of Image Processing System>

Figure 4:
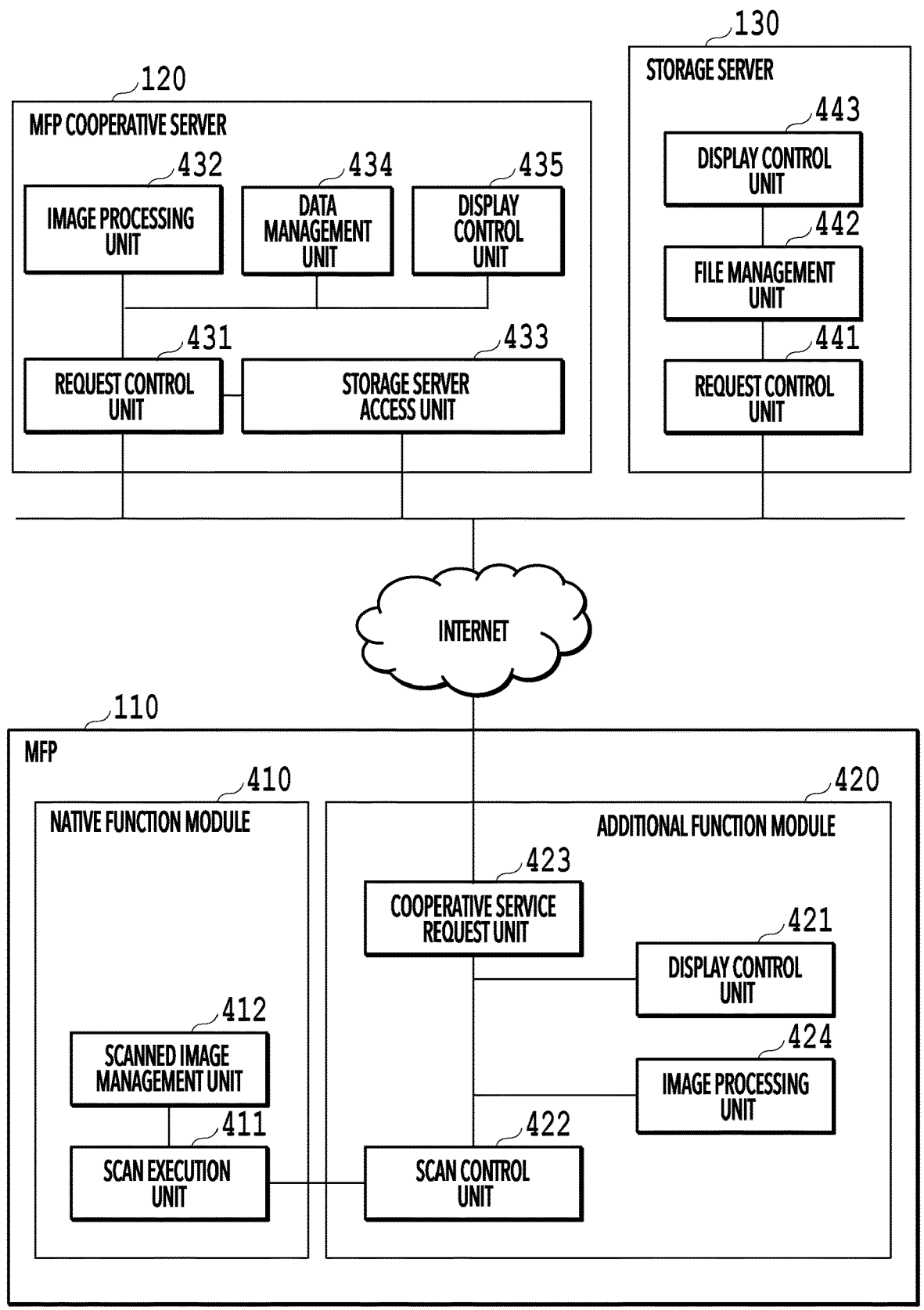
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the storage server 130, which configure the image processing system 100, is explained in order. In the following, explanation is given by narrowing the various functions possessed by each apparatus to the functions relating to the processing up to processing to computerize (file) a document by performing a scan and save the computerized document in the storage server 130.

<<Software Configuration of MFP>>

The function modules of the MFP 110 are roughly divided into two modules, that is, a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for receiving various user operations on a touch panel of the operation unit 220. The various user operations include, for example, inputting of login authentication information for accessing the MFP cooperative server 120, scan setting, instructions to start a scan, file name setting, instructions to save a file and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is saved in the HDD 214 by the scanned image management unit 412. At this time, the scan control unit 422 is notified of information on a scanned image identifier uniquely indicating the saved scanned image data. The scanned image identifier is a number, symbol, alphabet and the like for uniquely identifying the image scanned in the MFP 110. The scan control unit 422 acquires, for example, the scanned image data that is the target to be filed from the scanned image management unit 412 by using the above-described scanned image identifier. Then, the scan control unit 422 instructs the cooperative service request unit 423 to make a request for processing necessary to file the scanned image data to the MFP cooperative server 120.

The cooperative service request unit 423 makes requests for various kinds of processing to the MFP cooperative server 120, receives responses thereto, and so on. The various kinds of processing include, for example, login authentication, scanned image analysis, transmission of scanned image data and the like. For transmission and reception with the MFP cooperative server 120, the communication protocol, such as REST and SOAP, is used.

The image processing unit 424 generates an image used on the UI screen that is displayed by the display control unit 421 by performing predetermined image processing for scanned image data. Details of the predetermined image processing will be described later.

It may also be possible for an apparatus (client PC or the like, not shown schematically) different from the MFP 110 to comprise the above-described additional function module 420. That is, the system configuration may be one in which a client PC makes an analysis request for the scanned image obtained by the MFP 110 and performs the setting of a file name based on analysis results.

<<Software Configuration of Server Apparatus>>

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with received request contents. The image processing unit 432 performs image modification processing, such as rotation and inclination correction, in addition to image analysis processing, such as character area detection processing, character recognition processing (OCR processing), and similar document determination processing, for the scanned image data that is sent from the MFP 110. In the following, a character area detected from a scanned image is called "text block". The storage server access unit 433 makes a request for processing to the storage server 130. The cloud service has made public a variety of interfaces for saving a file in the storage server, acquiring a saved file, and so on by using a protocol, such as REST and SOAP. The storage server access unit 433 makes a request to the storage server 130 by using the interface made public. The data management unit 434 stores and manages user information, various kinds of setting data and the like, which are managed in the MFP cooperative server 120. The display control unit 435 receives a request from a web browser running on a PC or a mobile terminal (neither of them is shown schematically) connected via the internet and returns screen configuration information (HTML, CSS and the like) necessary for the screen display. It is possible for a user to check the registered user information, change the scan setting, and so on via the screen displayed on the web browser.

Next, the software configuration of the storage server 130 is explained. The storage server 130 has a request control unit 441, a file arrangement unit 442, and a display control unit 443. The request control unit 441 stands by in the state of being capable of receiving a request from an external apparatus and in the present embodiment, instructs the file arrangement unit 442 to save a received file and read a saved file in response to a request from the MFP cooperative server 120. Then, the request control unit 441 returns a response in accordance with the request to the MFP cooperative server 120. The display control unit 443 receives a request from a web browser running on a PC or a mobile terminal (neither of them is shown schematically) connected via the internet and returns screen configuration information (HTML, CSS and the like) necessary for the screen display. It is possible for a user to check and acquire a saved file via the screen that is displayed on the web browser.

<Flow of Processing of Entire Image Processing System>

Figure 5B:
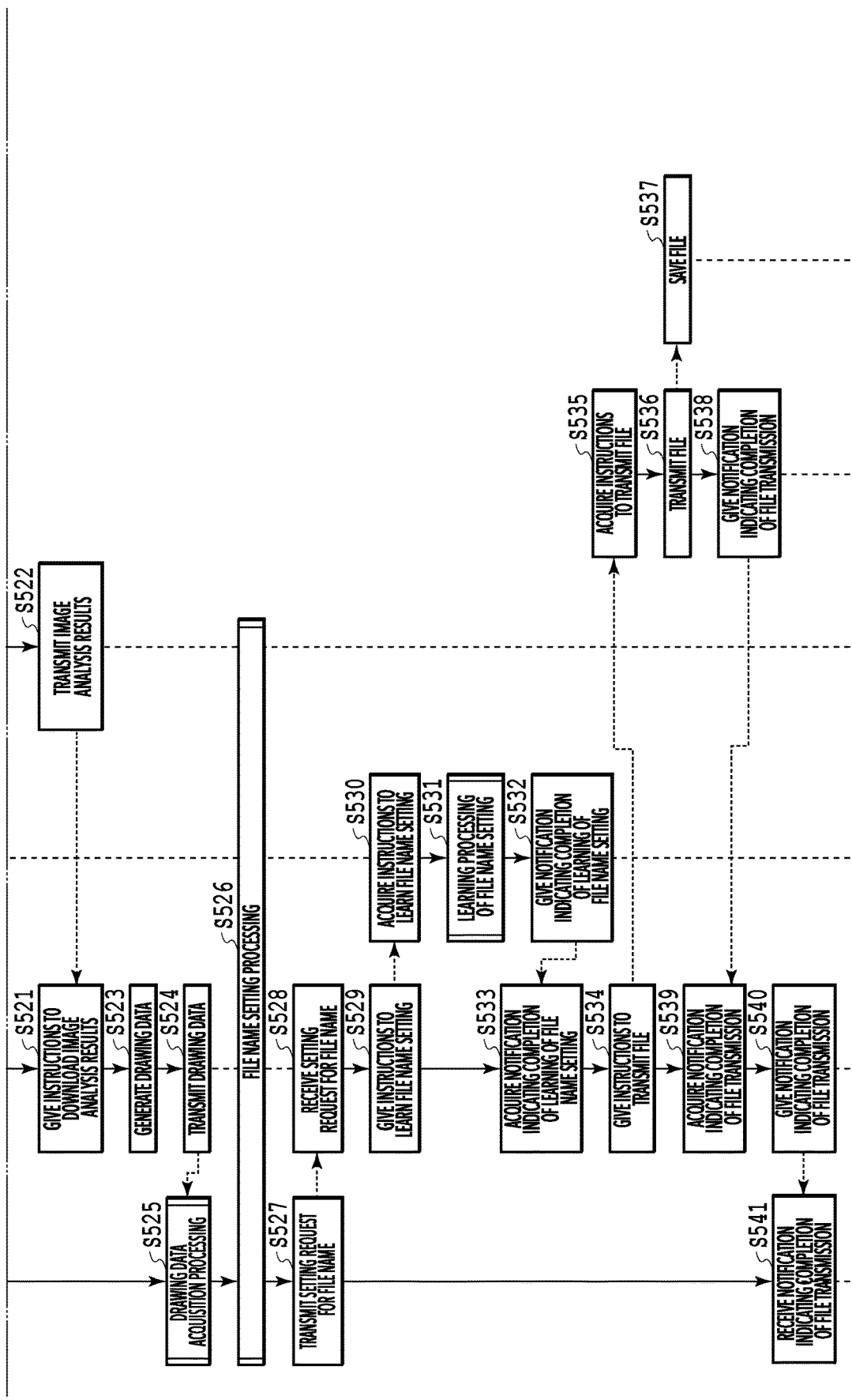
FIG. 5 is a diagram showing a relationship between FIGS. 5A and 5B, and FIGS. 5A and 5B are sequence diagrams showing a flow of processing of the entire image processing system.
Figure 6:
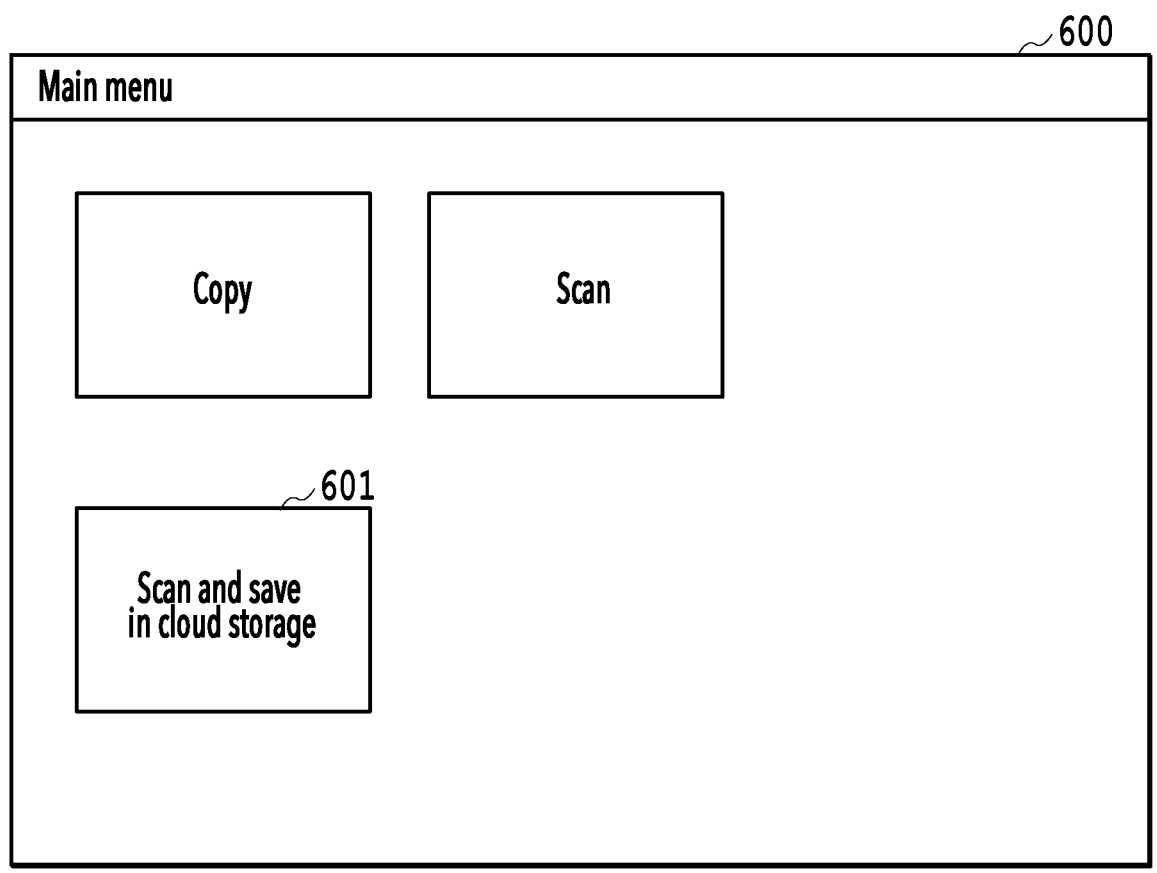
FIG. 6 is a diagram showing an example of a Main screen.

FIGS. 5A and 5B are sequence diagrams showing a flow of processing among the apparatuses in a case where a document is scanned in the MFP 110 and the obtained scanned image is filed and saved in the storage server 130. FIG. 6 is a diagram showing an example of a UI screen of a Main menu (hereinafter, described as "Main screen") that is displayed at the time of the activation of the MFP 110. In a case where a document is filed by performing a scan and a dedicated application necessary to make use of the cloud storage service is installed, a "Scan and save in cloud storage" button 601 is displayed on a Main screen 600. Then, in a case where a user presses down the "Scan and save in cloud storage" button 601 among the menu buttons displayed within the Main screen 600, the series of processing shown in the sequence diagrams in FIGS. 5A and 5B starts. In the following, along the sequence diagrams in FIGS. 5A and 5B, the operations among the apparatuses are explained in a time series. Symbol "S" in the sequence diagram and each flowchart, to be described later, represents a step.

Figure 7:
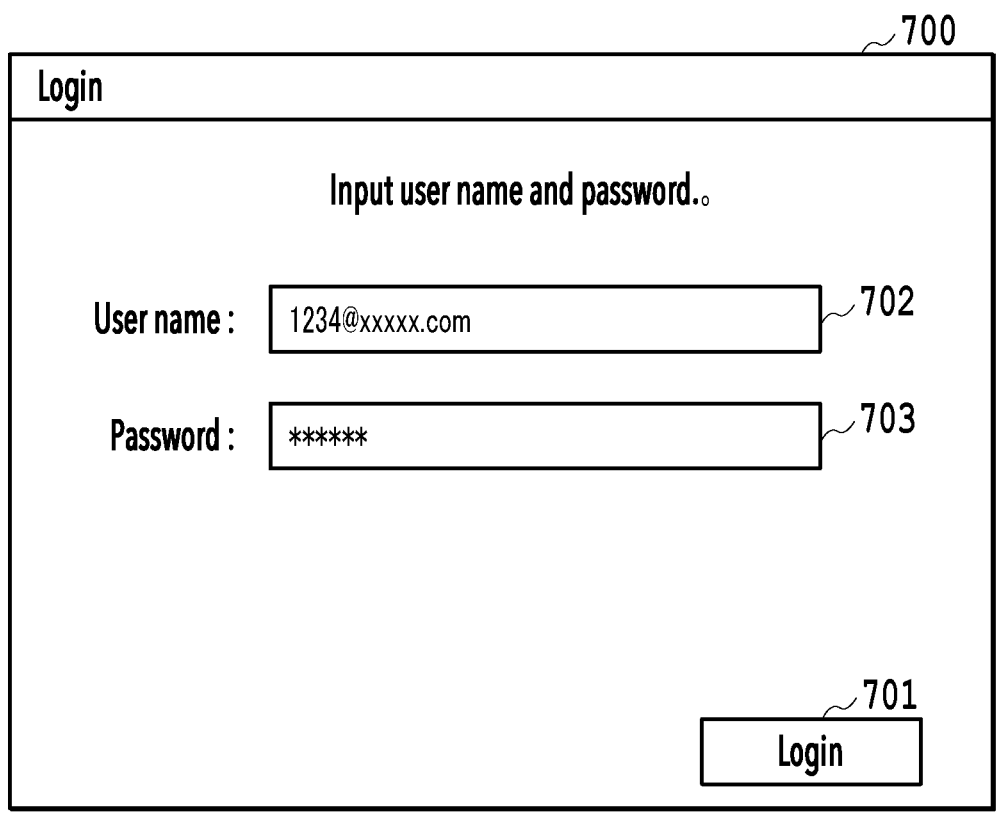
FIG. 7 is a diagram showing an example of a Login screen.

First, a scan application within the MFP 110 displays a UI screen (hereinafter, described as "Login screen") on which to input information on login authentication for accessing the MFP cooperative server 120 (S501). FIG. 7 shows an example of a Login screen. In a case where a user inputs a user ID and a password, which are registered in advance, to input fields 702 and 703, respectively, on a Login screen 700 and presses down a "Log in" button 701, a request for login authentication is transmitted to the MFP cooperative server 120 (S502). The MFP cooperative server 120 receives the login request (S503), verifies whether the user name and the password included in the request are correct (S504), and returns an access token to the MFP 110 in a case where they are correct (S505). After this, by sending this access token together at the time of the MFP 110 making various requests to the MFP cooperative server 120, a login user is specified. In the present embodiment, it is assumed that at the same time the login to the MFP cooperative server 120 is completed, the login to the storage server 130 is also completed. Because of this, a user performs in advance association between the user ID for making use of the MFP cooperative service and the user ID for making use of the storage service via a web browser or the like of a PC (not shown schematically) on the internet. Due to this, in a case where the login authentication to the MFP cooperative server 120 succeeds, the login authentication to the storage server 130 is also completed at the same time and it is possible to omit the operation to log in to the storage server 130. Then, it is made possible for the MFP cooperative server 120 to deal with a request relating to the storage service from a user who has logged in to the MFP cooperative server 120. Generally, it may be possible to perform the login authentication method by using a publicly known method (Basic authentication, Digest authentication, authentication using OAuth, and the like).

Figure 8:
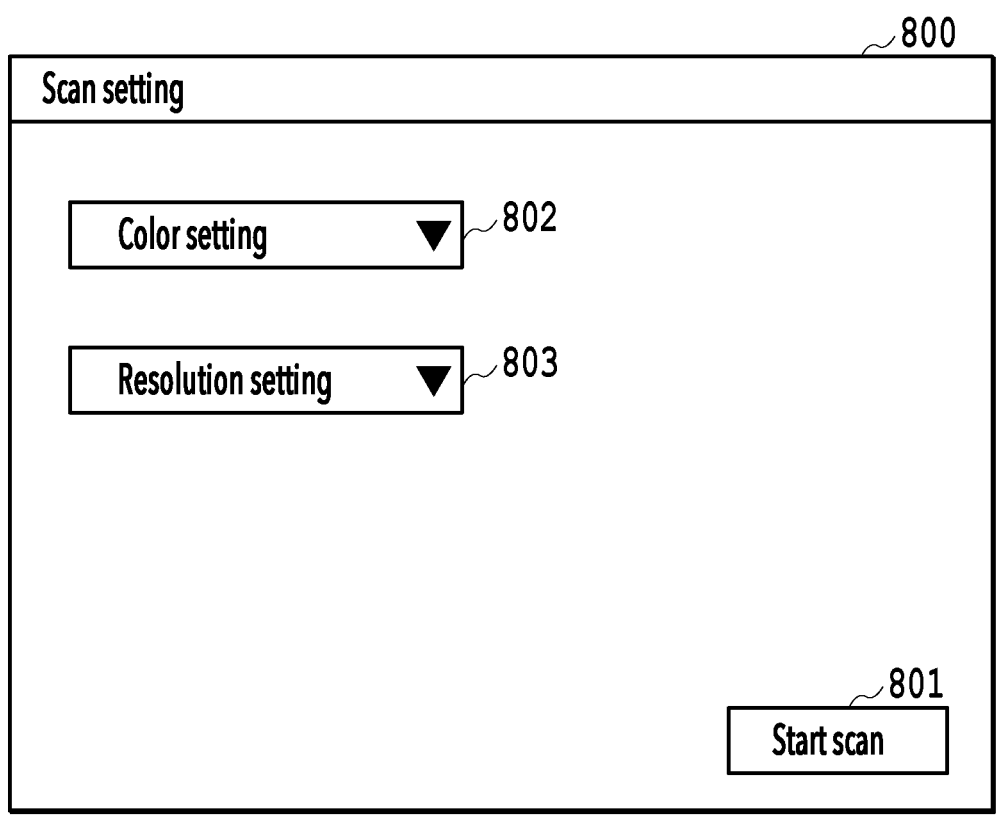
FIG. 8 is a diagram showing an example of a Scan setting screen.

Upon receipt of the login authentication results (S506), the MFP 110 performs scan processing (S507). FIG. 8 shows an example of a Scan setting screen. On a Scan setting screen 800, a "Start scan" button 801, a Color setting field 802, and a Resolution setting field 803 exist. The "Start scan" button 801 is a button to give instructions to start scan processing for a document (in the present embodiment, a business form, such as an estimate form and a bill, is supposed) set on a document table. In the Color setting field 802, the color mode at the time of scan is set. For example, it is possible to specify one of alternatives, such as full color and monochrome. In the Resolution setting field 803, the resolution at the time of scan is set. For example, it is possible to specify one of alternatives, such as 600 dpi and 1,200 dpi. The color mode and the resolution are examples of the setting items and it is not necessary for all of these setting items to exist, or another setting item other than these may exist. Further, it may also be possible to limit the alternatives relating to the color mode and the resolution only to the setting values required in the storage service. A login user performs detailed condition setting as to the scan processing via the Scan setting screen 800 such as this. In a case where a login user having completed the scan setting sets a scan-target document on the document table of the MFP 110 and presses down the "Start scan" button 801, a scan is performed. Due to this, image data obtained by computerizing a paper document is generated. After the scan is completed, the MFP 110 transmits the image data obtained by the scan to the MFP cooperative server 120 along with an analysis request therefor (S508). Upon receipt of the analysis request (S509), the request control unit 431 of the MFP cooperative server 120 first instructs the data management unit 434 to upload scanned image data (S510). At this time, the request control unit 431 returns "processId" uniquely indicating the received analysis request to the MFP 110 without waiting for completion of image analysis processing, to be described later. FIG. 9A shows an example of a request ID. The data management unit 434 saves the scanned image data in accordance with the upload instructions (S511). In the upload instructions, "processId" described previously is included and the data management unit 434 associates the scanned image data and "processId" with each other and saves them. Next, the request control unit 431 instructs the image processing unit 432 to perform image analysis processing for the scanned image data (S512). In the instructions to perform image analysis processing, "processId" is included and the image processing unit 432 receives the scanned image data by instructing the data management unit 434 to download the scanned image data saved at S511 by using "processId" (S513 to S515). Then, the image processing unit 432 performs image analysis processing for the received scanned image data (S516).

<<Image Analysis Processing>>

Figure 10:
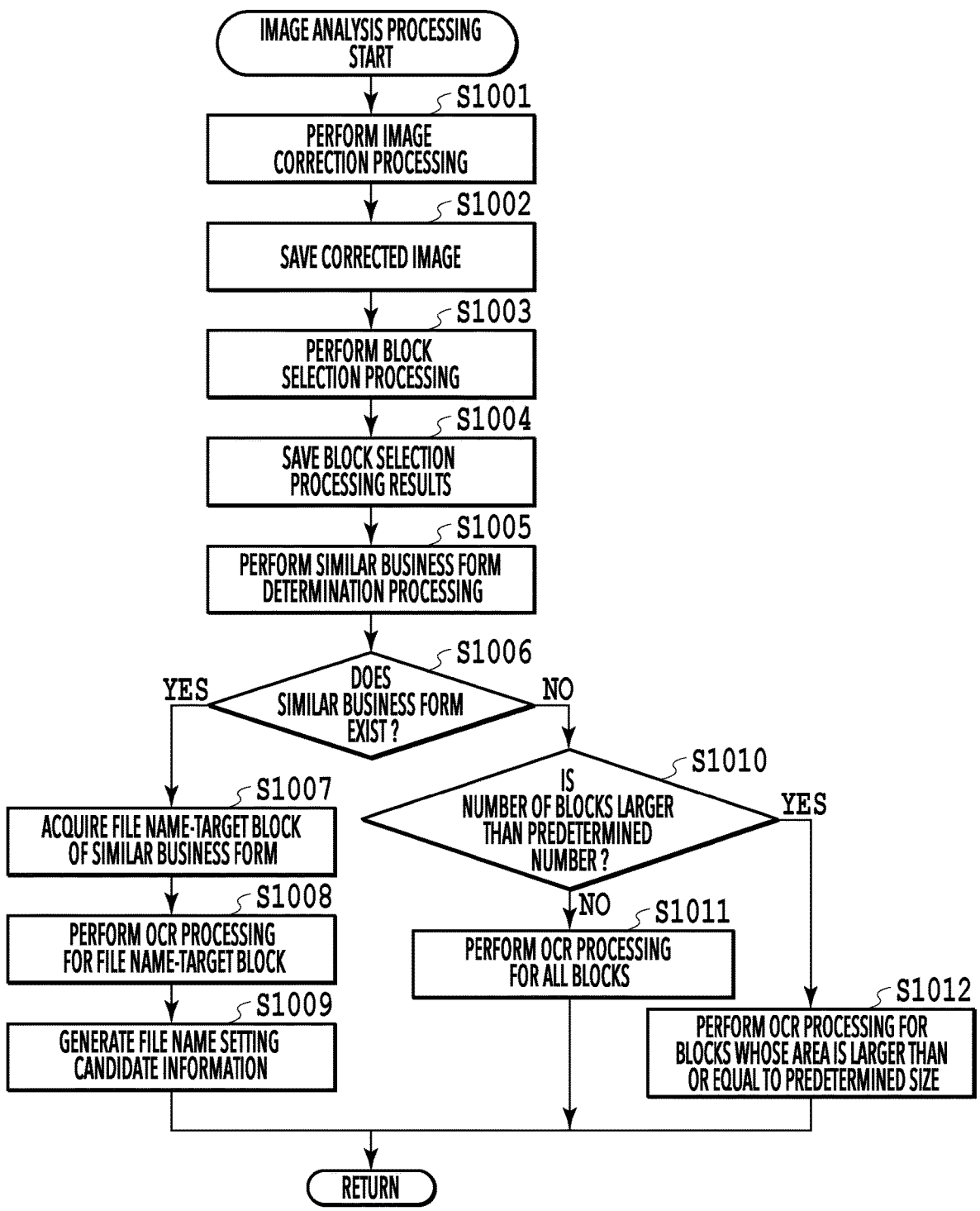
FIG. 10 is a flowchart showing details of image analysis processing according to a first embodiment.

FIG. 10 is a flowchart explaining a detailed procedure of the image analysis processing performed at S516. First, at S1001, correction processing is performed for processing-target scanned image data. The correction processing that is performed here is preprocessing for subsequent processing and for example, rotation correction and skew correction processing for the scanned image data. At S1002 that follows, the data management unit 434 is instructed to upload the corrected scanned image data (hereinafter, described as "corrected image data") obtained at S1001. The data management unit 434 having received the upload instructions saves the corrected image data in association with "processId". At S1003 that follows, processing to detect a text block within the image (hereinafter, called "block selection processing") is performed for the corrected image data obtained at S1001. By this block selection processing, the position and size of the text block existing within the corrected image are specified. Table 1 shown below is a table that puts together the results obtained by performing the block selection processing for the scanned image data (corrected image data) of the estimate form shown in FIG. 11 so that the results are easily understood.

TABLE 1

| No. | X-coordinate of area | Y-coordinate of area | Width of area | Height of area | Character string within area |
|---|---|---|---|---|---|
| 1 | 1019 | 303 | 489 | 95 | |
| 2 | 261 | 446 | 243 | 43 | |
| 3 | 1584 | 446 | 262 | 36 | |
| 4 | 1874 | 443 | 230 | 47 | |
| 5 | 255 | 531 | 798 | 47 | |
| 6 | 1671 | 530 | 165 | 44 | |
| 7 | 1872 | 527 | 259 | 54 | |
| 8 | 406 | 626 | 594 | 71 | |
| 9 | 1164 | 636 | 112 | 55 | |
| 10 | 456 | 1186 | 105 | 55 | |
| 11 | 1102 | 1188 | 100 | 55 | |
| 12 | 1510 | 1188 | 101 | 55 | |
| 13 | 2043 | 1187 | 113 | 57 | |
| 14 | 400 | 1356 | 230 | 45 | |
| 15 | 1023 | 1358 | 180 | 45 | |
| 16 | 1562 | 1358 | 27 | 46 | |
| 17 | 2023 | 1358 | 182 | 51 | |
| 18 | 398 | 1447 | 230 | 54 | |
| 19 | 1003 | 1448 | 203 | 47 | |
| 20 | 1572 | 1448 | 10 | 47 | |
| 21 | 2003 | 1448 | 204 | 47 | |
| 22 | 1517 | 2038 | 128 | 63 | |
| 23 | 1950 | 2042 | 238 | 58 | |
| 24 | 972 | 2770 | 581 | 72 | |
| 25 | 1167 | 2925 | 615 | 43 | |

The area indicated by each number of "1 to 25" is indicated by the X-coordinate and the Y-coordinate of the top-left corner thereof, the width, and the height and due to this, the text block corresponding to one row of a character string is represented by a rectangular area. Because the text block is represented as a rectangular area as described above, this is called "block selection processing". Further, in the block selection results shown in Table 1, a column (Character string within area) for representing the character string within each block also exists and here, the character string corresponding to each block recognized by the OCR processing, to be described later, is written sequentially.

Explanation is returned to the flow in FIG. 10. At S1004, the data management unit 434 is instructed to upload the results of the block selection processing described above. The data management unit 434 having received the upload instructions saves the results of the block selection processing in association with "processId". FIG. 12 shows an example of the block selection results that are saved by the data management unit 434. In FIG. 12, "imageWidth" indicates the number of pixels in the X-direction (horizontal direction) of the analysis-target image, "imageHeight" indicates the number of pixels in the Y-direction (vertical direction) of the analysis-target image and in "regions", coordinate information "rect" on the character area extracted from the analysis-target image and information "text" on the character recognition results are included. Further, "rect" indicates each coordinate of the extracted text block, "x" indicates the X-coordinate of the top left of the area, "y" indicates the Y-coordinate of the top left of the area, "width" indicates the number of pixels in the X-direction of the area, "height" indicates the number of pixels in the Y-direction of the area, and in "text", information on the character recognition results (recognized character string) obtained by performing the OCR processing for the text block indicated by "rect" is input. In FIG. 12, no information is input to any "text" and "text" is blank, but a character string recognized within the block that is the target of the OCR processing, to be described later, is written sequentially. Each piece of information of these "rect" and "text" is obtained corresponding to the number of all text blocks within the analysis-target image (in FIG. 12 a part is omitted).

Explanation is returned to the flow in FIG. 10. At S1005, the block selection results saved at S1004 for the computerization-target document and the block selection results for the document for which computerization has already been performed are compared. At S1006 that follows, whether or not there is a document whose text block arrangement is similar to that of the computerization-target document among the computerized documents is determined based on the comparison results. In the present embodiment, as the processing-target document, a business form, such as an estimate form, is supposed. Consequently, both pieces of processing at S1005 and S1006 are called together "similar business form determination processing". Determining whether or not the text block arrangement is similar between the current computerization-target document and the past computerized document has the same meaning as determining whether or not the document format is similar. Consequently, it is possible to call the similar business form determination processing as processing to determine whether or not a document format is similar. The information (learning data) relating to the past computerized business form to be used in this similar business form determination processing is saved and accumulated by learning processing (S531), to be described later. In a case where the results of the similar business form determination processing indicate that a similar business form whose text block arrangement is the same or similar exits, the processing advances to S1007 and in a case where such a similar business form does not exist, the processing advances to S1010.

Here, it is assumed that the estimate form as shown in FIG. 13 was scanned in the past and the block selection results for the scanned image thereof are saved as learning data. Similar business form determination results that are output at S1005 at this time are shown in FIG. 14. In FIG. 14, in "matched", a value indicating whether a scanned image whose text block arrangement, that is, whose format is the same or similar is found among the past scanned images for the scanned image that is the target of the analysis of this time (analysis-target image) is stored. In "formId", a value uniquely indicating the scanned image is stored in a case where there is a scanned image of the similar business form and in a case where there is not a scanned image such as this, a value uniquely identifying the analysis-target image and which is used at the time of causing the file name that is set this time to be learned in learning processing, to be described later, is stored. In "matchingScore", a value indicating in which degree a similar business form is similar in a case where there is a similar business form is stored. In "matchingScore", a real number value between "0 and 1" indicating the matching rate between the information on the text block arrangement in the past scanned image and the information on the text block arrangement in the analysis-target image is stored. The larger real number value indicates the higher matching rate. In "rectInfoArray", information indicating the text block of the analysis-target image, which corresponds to the text block used in the past by a user at the time of file name setting for the similar business form is stored. Here, it is assumed that the file name setting has been performed for the scanned image of the estimate form shown in FIG. 13 by using the two character strings "Estimate form" and "Shimomaruko Inc." and the learning processing (input results learning) of the user input information at that time has already been performed before the scan of this time. Then, it is also assumed that the scanned image of the estimate form shown in FIG. 11 is determined to be similar to the scanned image of the estimate form shown in FIG. 13, which was computerized in the past, as a result of the similar business form determination processing being performed this time by taking the scanned image of the estimate form shown in FIG. 11 as the analysis-target image. The example in FIG. 14 shows the state where the user input information on the past scanned image shown in FIG. 13 is stored as automatic input target-information on the scanned image of this time shown in FIG. 11 based on the determination results. First, by using the learning data generated by learning processing, to be described later, a text block is specified, whose coordinate information partially overlaps the coordinate information on each text block of "Estimate form" and "Shimomaruko Inc." used as the file name for the past scanned image shown in FIG. 13. Then, the partially overlapping coordinate information on the text block and the character string thereof are stored in "text" within "rectInfoArray". Here, each item that is included within "rectInfoArray" is explained. In "key", a value uniquely indicating the text block that is used for automatic input is stored. In "region", the coordinate information on the text block and the character string recognized within the character area are stored. Then, "rect" indicates each coordinate of the extracted text block, "x" indicates the X-coordinate of the top left of the area, "y" indicates the Y-coordinate of the top left of the area, "width" indicates the number of pixels in the X-direction of the area, "height" indicates the number of pixels in the Y-direction of the area, and in "text", information on the character recognition results (recognized character string) obtained by performing the OCR processing for the text block indicated by "rect" is input. In FIG. 14, information is not input to any "text" and "text" is blank, but a character string recognized with each block recognized by the OCR processing, to be described later, for the scanned image of this time shown in FIG. 11 is stored. In "metadataArray", information indicating the order of text blocks used as a file name and at which position a delimiter is input for automatically inputting a file name is stored. In a case where property information, such as a folder path and metadata, is set other than a file name, necessary information is added to "rectInfoArray" and "metadataArray". Here, each item that is included within "metadataArray" is explained. In "key", a value uniquely indicating the setting value that is set to the scanned image is stored. In "keyType", a value indicating the type of the setting value is stored. In a case where this is used for a file name, "key" is "filename" and "keyType" is "filename". In "value", information on the text block used for the value of "key" and the delimiter is stored. The example in FIG. 14 shows that a file name is input automatically in the order of the area having "key" of "fileRegion0" in "rectInfoArray", the delimiter, and the area having "key" of "fileRegion1".

Explanation is returned to the flow in FIG. 10. At S1007, information on the text block of the analysis-target image (hereinafter, called "block information") is acquired, which corresponds to the text block of the character string that is set as the file name to the similar business form found in the similar business form determination processing. Specifically, the information of each "rect" in the example in FIG. 14 described previously is acquired. At S1008 that follows, the OCR processing is performed for each text block specified by the block information acquired at S1007. In the case of the example in FIG. 14 described previously, block information corresponding to two text blocks whose (x, y, width, height)=(1019, 303, 489, 95) and (406, 626, 594, 71) is acquired at S1007. In this case, the OCR processing is performed for the two text blocks, respectively, and each character string of "Estimate form" and "Shinagawa Inc." is recognized.

At S1009 that follows, information on blocks and character strings that are setting candidates of the file name for the analysis-target image (hereinafter, described as "file name setting candidate information") is generated and saved in the data management unit 434. As shown in FIG. 15, the file name setting candidate information is obtained by adding the character string obtained by the OCR processing at S1008 to "text" of the similar business form determination results shown in FIG. 14.

The case where the determination results at S1006 indicate that there is a similar business form has been explained so far. Following the above, the processing procedure after S1010 in a case where the determination results at S1006 indicate that there is no similar business form is explained.

First, at S1010, whether or not the number of text blocks extracted from the analysis-target image is larger than or equal to a predetermined number (threshold value) is determined. It may be possible to determine the predetermined number in advance based on the processing capacity of the image processing unit 432 within the MFP cooperative server 120 and the contents (supposed number of blocks and the like) of the document format of each business form or the like, which is the image analysis target. In a case where the results of the determination indicate that the number of text blocks is less than or equal to the predetermined number, the processing advances to S1011 and in a case where the number of blocks is larger than the predetermined number, the processing advances to S1012. At S1011, the OCR processing is performed for all the text blocks extracted by the block selection processing for the analysis-target image. On the other hand, at S1012, among all the extracted text blocks, the OCR processing is performed by taking only the text block(s) whose area (that is, the product of width and height) is larger than or equal to a predetermined size as a target. Here, the text block is extracted in units of rows, and therefore, the text block including a character whose character size is larger has a larger area. Generally, the character size of the character string portion, such as the title of a business form (Estimate form, Bill and the like), Company name, Address, and Date, is large, and therefore, the OCR processing is performed only for the text blocks including the character string such as this as a result. Here, explanation is given by using a specific example. It is assumed that a predetermined number that is used for the determination at S1010 is "30" and then, the analysis-target image is the scanned image shown in FIG. 11 and by the block selection processing, the results shown in Table 1 described previously are obtained. In this case, the number of text blocks included in the analysis-target image is "25" and this is smaller than the predetermined number "30", and therefore, the OCR processing is performed for all the 25 text blocks extracted at S1011. On the other hand, it is assumed that the analysis-target image is the scanned image shown in FIG. 16 and the results of the contents shown in Table 2 below are obtained by the block selection processing.

TABLE 2

| No. | X-coordinate of area | Y-coordinate of area | Width of area | Height of area | Character string within area |
|---|---|---|---|---|---|
| 1 | 1019 | 303 | 489 | 95 | |
| 2 | 261 | 446 | 243 | 43 | |
| 3 | 1584 | 446 | 262 | 36 | |
| 4 | 1874 | 443 | 230 | 47 | |
| 5 | 255 | 531 | 798 | 47 | |
| 6 | 1671 | 530 | 165 | 44 | |
| 7 | 1872 | 527 | 259 | 54 | |
| 8 | 406 | 626 | 594 | 71 | |
| 9 | 1164 | 636 | 112 | 55 | |
| 10 | 456 | 1186 | 105 | 55 | |
| 11 | 1102 | 1188 | 100 | 55 | |
| 12 | 1510 | 1188 | 101 | 55 | |
| 13 | 2043 | 1187 | 113 | 57 | |
| 14 | 400 | 1356 | 230 | 45 | |
| 15 | 1023 | 1358 | 180 | 45 | |
| 16 | 1562 | 1358 | 27 | 46 | |
| 17 | 2023 | 1358 | 182 | 51 | |
| 18 | 398 | 1447 | 230 | 54 | |
| 19 | 1003 | 1448 | 203 | 47 | |
| 20 | 1572 | 1448 | 10 | 47 | |
| 21 | 2003 | 1448 | 204 | 47 | |
| 22 | 400 | 1538 | 230 | 46 | |
| 23 | 1020 | 1539 | 180 | 45 | |
| 24 | 1571 | 1539 | 10 | 47 | |
| 25 | 2000 | 1539 | 180 | 45 | |
| 26 | 390 | 1629 | 260 | 46 | |
| 27 | 1020 | 1630 | 180 | 45 | |
| 28 | 1572 | 1630 | 10 | 45 | |
| 29 | 1998 | 1630 | 195 | 45 | |
| 30 | 1517 | 2038 | 128 | 63 | |
| 31 | 1950 | 2042 | 238 | 58 | |
| 32 | 972 | 2770 | 581 | 72 | |
| 33 | 1167 | 2925 | 615 | 43 | |

In this case, the number of blocks included in the analysis-target image is "33" and this is larger than the predetermined number "30", and therefore, the OCR processing is performed only for the text blocks whose area is larger than or equal to the predetermined size among the 33 text blocks extracted at S1012. Here, it is assumed that the value of "predetermined size" is "30000". Among all the 33 text blocks shown in Table 2 described above, the text blocks whose area exceeds "30000" are four text blocks whose No. is 1, 5, 8, and 32. Consequently, the OCR processing is performed for these four text blocks and the character strings of "Estimate form", "1-1-1 Minato-ku, Tokyo", "Shinagawa Inc.", and "Kawasaki Inc." are acquired respectively.

The above is the contents of the image analysis processing that is performed at S516. Explanation is returned to the sequence diagram in FIG. 5A. In the explanation of S517 and subsequent steps, a flow of processing is explained in a case where a similar business form exists (NO at S1006) and it is determined that the number of blocks is larger than the predetermined number (YES at S1010), and the OCR processing is performed only for the text blocks whose size is larger than or equal to the predetermined size.

The image processing unit 432 having performed the above-described image analysis processing instructs the data management unit 434 to upload the results of the image analysis processing (S517). In the results of the image analysis processing, which are uploaded here, the results of the OCR processing at S1008, S1011, and S1012 described previously, and further, the results (file name setting candidate information) in a case where S1009 is performed are included. Here, the data management unit 434 is instructed to upload the character recognition results obtained by the OCR processing at S1012. Table 3 below are a table that puts together the character recognition results that are uploaded at this time so that they are easily understood.

TABLE 3

| No. | X-coordinate of area | Y-coordinate of area | Width of area | Height of area | Character string within area |
|---|---|---|---|---|---|
| 1 | 1019 | 303 | 489 | 95 | Estimate from |
| 2 | 261 | 446 | 243 | 43 | |
| 3 | 1584 | 446 | 262 | 36 | |
| 4 | 1874 | 443 | 230 | 47 | |
| 5 | 255 | 531 | 798 | 47 | 1-1-1 Minatoku, Tokyo |
| 6 | 1671 | 530 | 165 | 44 | |
| 7 | 1872 | 527 | 259 | 54 | |
| 8 | 406 | 626 | 594 | 71 | Shinagawa Inc. |
| 9 | 1164 | 636 | 112 | 55 | |
| 10 | 456 | 1186 | 105 | 55 | |
| 11 | 1102 | 1188 | 100 | 55 | |
| 12 | 1510 | 1188 | 101 | 55 | |
| 13 | 2043 | 1187 | 113 | 57 | |
| 14 | 400 | 1356 | 230 | 45 | |
| 15 | 1023 | 1358 | 180 | 45 | |
| 16 | 1562 | 1358 | 27 | 46 | |
| 17 | 2023 | 1358 | 182 | 51 | |
| 18 | 398 | 1447 | 230 | 54 | |
| 19 | 1003 | 1448 | 203 | 47 | |
| 20 | 1572 | 1448 | 10 | 47 | |
| 21 | 2003 | 1448 | 204 | 47 | |
| 22 | 400 | 1538 | 230 | 46 | |
| 23 | 1020 | 1539 | 180 | 45 | |
| 24 | 1571 | 1539 | 10 | 47 | |
| 25 | 2000 | 1539 | 180 | 45 | |
| 26 | 390 | 1629 | 260 | 46 | |
| 27 | 1020 | 1630 | 180 | 45 | |
| 28 | 1572 | 1630 | 10 | 45 | |
| 29 | 1998 | 1630 | 195 | 45 | |
| 30 | 1517 | 2038 | 128 | 63 | |
| 31 | 1950 | 2042 | 238 | 58 | |
| 32 | 972 | 2770 | 581 | 72 | Kawasaki Inc. |
| 33 | 1167 | 2925 | 615 | 43 | |

Figure 19:
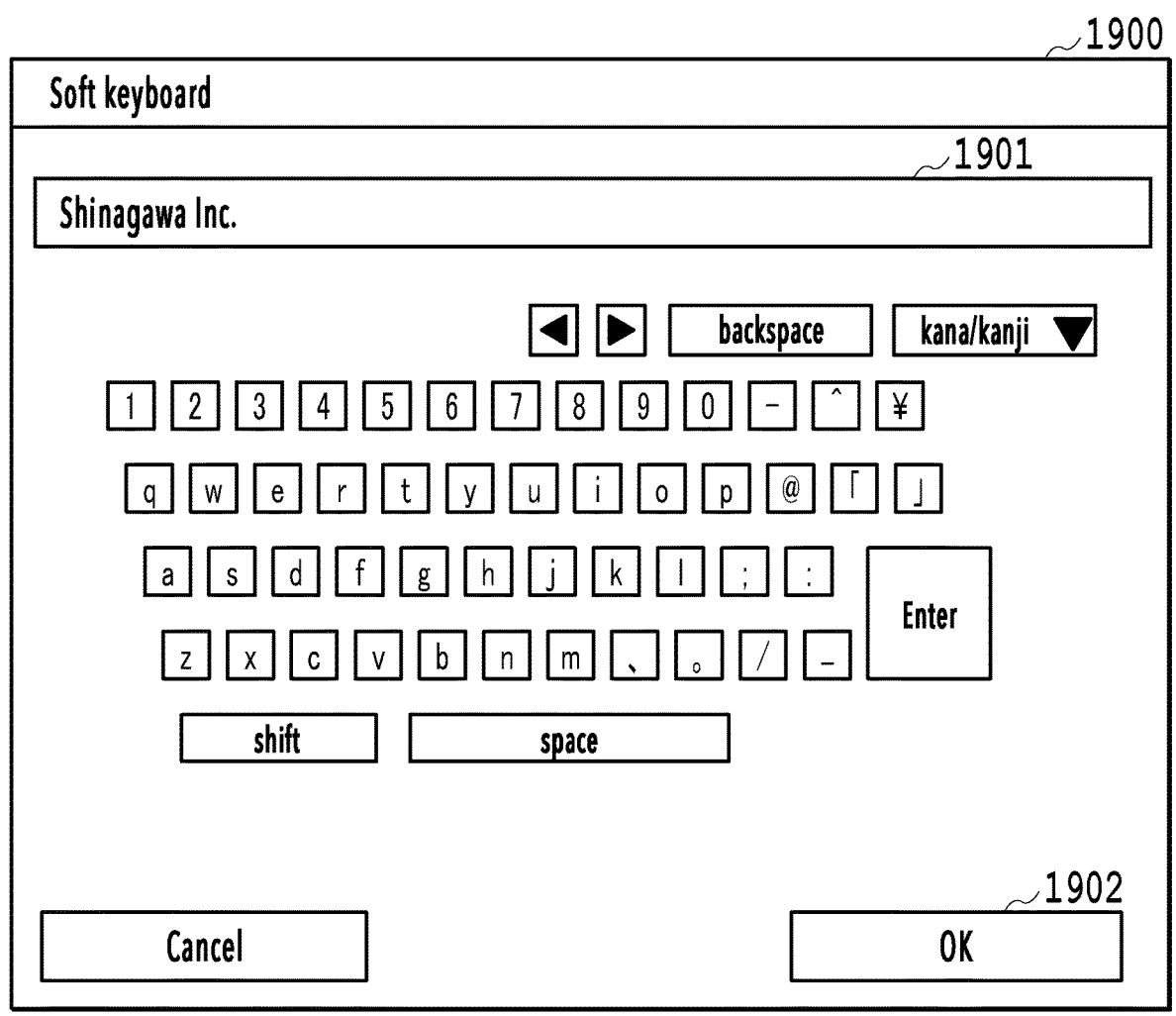
FIG. 19 is a diagram showing an example of a soft keyboard.

Then, FIG. 17 shows actual data on the character recognition results, which is transmitted to the data management unit 434 along with the above-described upload instructions. Further, in the above-described upload instructions, "processId" for performing association of data is included. As is obvious from Table 3 described above and FIG. 17, the contents are such that the recognized character strings obtained by the OCR processing at S1012 are added to the results (see FIG. 12) of the block selection processing at S1003. The data management unit 434 having received the above-described upload instructions saves the OCR results in the data format shown in FIG. 17 in association with "processId" (S518). Then, the image processing unit 432 notifies the request control unit 431 that the image analysis processing is completed (S519). In this completion notification, "processId" for association with the image analysis results is included. The request control unit 431 receives the completion notification of the image analysis processing (S520), specifies "processId" included in the completion notification, and instructs the data management unit 434 to download the image analysis results (S521). In the image analysis results that are downloaded at this time, the corrected image data for which the upload instructions are given by the image processing unit 432 at S1002 is also included, in addition to the data for which the upload instructions are given by the image processing unit 432 at S517. The data management unit 434 having received the instructions to download the image analysis results acquires the image analysis results associated with "processId" specified by the request control unit 431 and delivers the image analysis results to the request control unit 431 (S522). Then, the request control unit 431 generates drawing data of a File name setting screen that is displayed on the operation unit 220 of the MFP 110 based on the acquired image analysis results (S523). FIG. 18 shows an example of a File name setting screen. On a File name setting screen 1800 in FIG. 18, a file name area 1801 is an area in which a file name set by a user is displayed. Further, in a case where the blank portion in the file name area 1801 is touched, a soft keyboard 1900 as shown in FIG. 19 is displayed and it is possible to input an arbitrary character. In a case where a file name is set and a character string is displayed, by touching the character string, a soft keyboard for correcting the character string corresponding to the touched portion is displayed and it is possible to correct the input character. In a preview area 1802, the preview image of the first page is displayed. Further, in a case where the text block within the preview image is touched, it is possible to add the text block corresponding to the touched position to the file name. It may also be possible to display the selected character string by attaching a shape, such as a line or a frame line, or a color to the selected text block so that it is known that the text block is selected. In a case where a plurality of text blocks is selected, it may also be possible to make the color of each text block different from one another. Further, it may also be possible to change the display position of the preview image or change the enlargement ratio so that the selected text block is located at the center. Furthermore, in a case where a plurality of text blocks exists, it may also be possible to calculate the display position of the preview image so that the text blocks corresponding to the number of areas set in advance are displayed. For example, a preview is displayed by changing the display position and the enlargement ratio so that the middle portion of the uppermost area and the lowermost area of the area used for the file name is located at the center in the vertical direction of the preview area 1802. In a case where the text block selected once is touched again, the selection is cancelled and the character string of the corresponding file name is deleted and the state where the line, color or the like attached to the text block is not displayed is returned. In the example, the description is such that in a case where no character string is selected, no text block is displayed on the preview image. However, in order to indicate which area can be touched to a user, it may also be possible to display the text block by using a color or a frame line so that the text block can be visually recognized. Further, it may also be possible to enable switching between display and non-display with a button or the like for the display that enables the text block to be recognized visually. By performing the swipe operation for the preview image, it is possible to move the position of the image that is displayed in the preview area 1802. A file name delete button 1803 deletes the characters corresponding to the text block added to the end of the file name. A preview enlargement button 1804 increases the magnification of the preview image being displayed in the preview area 1802. A preview reduction button 1805 reduces the magnification of the preview image being displayed in the preview area 1802. The display position is adjusted so that the coordinates of the center of the preview area 1102 are the same as those before enlargement and reduction at the time of performing enlargement and reduction. A preview initial display button 1806 returns the display magnification and the display position to those in the initial state in a case where the display position of the preview image has been moved by the swipe operation or the display magnification has been changed by pressing down the preview enlargement button 1804 or the preview reduction button 1805. A Transmit button 1807 is a button for transmitting the scanned image to the MFP cooperative server 120 along with the file name set on the File name setting screen 1800. In a case where the transmission is completed, the scan processing is terminated and the initial screen returns. In a case where the request control unit 431 generates drawing data of the File name setting screen 1800, for the preview area 1802, the corrected image data for which the upload instructions are given by the image processing unit 432 at S1002 is used. Further, in order to set the initial state of the file name for the scanned image and further set the corresponding character string as the character string used as the file name in a case where the text block within the preview area 1802 is touched, the data for which the upload instructions are given by the image processing unit 432 at S517 is used. Details of the procedure of the setting processing of the initial state of the file name and the procedure of the setting processing of the file name by the touch to the text block will be described later.

Explanation is returned to FIG. 5B. The drawing data of the File name setting screen generated by the request control unit 431 is transmitted to the MFP 110 (S524) in accordance with drawing data acquisition processing (S525), to be described later.

<<Drawing Data Acquisition Processing>>

Figure 20:
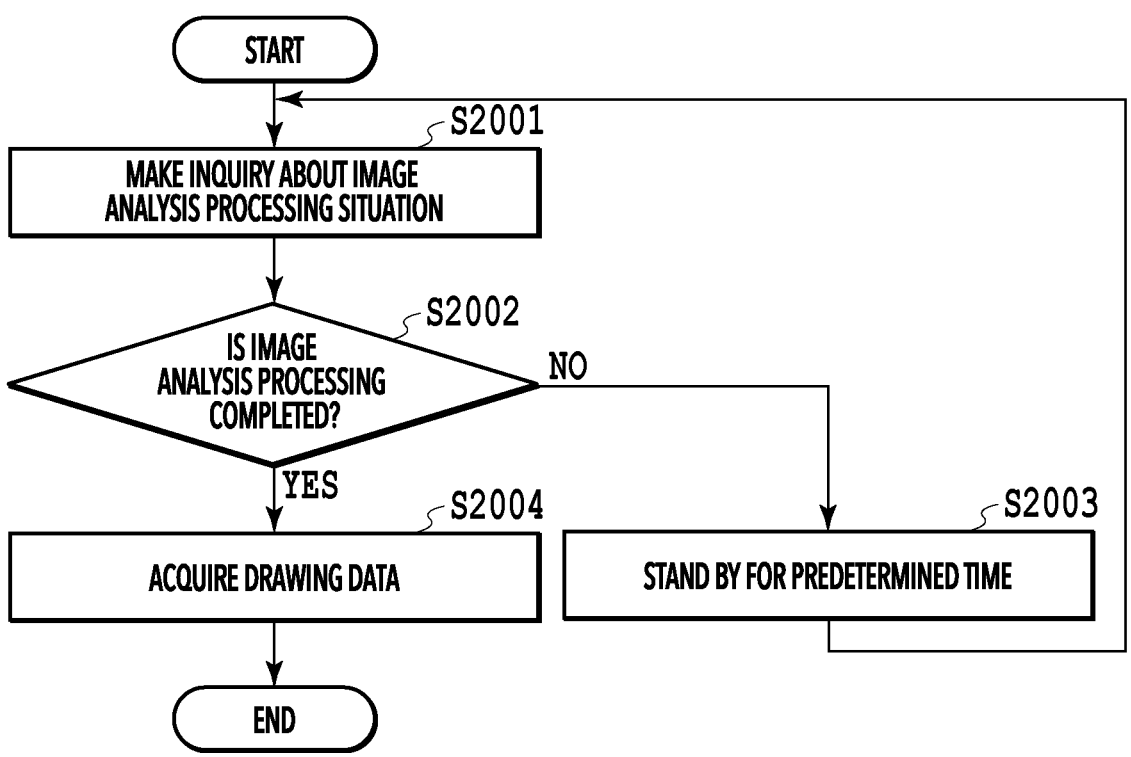
FIG. 20 is a flowchart showing details of drawing data acquisition processing.

FIG. 20 is flowchart showing a flow of processing for the MFP 110 to acquire drawing data. The series of processing shown in the flowchart in FIG. 20 is performed with the completion of the transmission processing (S508) of the analysis request for the scanned image described previously being taken as a trigger.

First, at S2001, an inquiry about the situation check of the image analysis processing is made to the MFP cooperative server 120 by using "processId" received from the request control unit 431. Upon receipt of the inquiry about the situation check, the MFP cooperative server 120 checks the situation of the image analysis processing associated with "processId" and in a case where the processing is being performed, returns, for example, the response as shown in FIG. 9B. On the other hand, in a case where the processing is completed, the MFP cooperative server 120 returns, for example, the response as shown in FIG. 9C. In the response at this time, the character string indicating the current processing situation is stored in "status". In a case where "status" in FIG. 9B is "processing", it is indicated that the processing is being performed in the MFP cooperative server 120. In a case where "status" in FIG. 9C is "completed", it is indicated that the processing is in the completed state. The response shown in FIG. 9C corresponds to the drawing data that is transmitted by the MFP cooperative server 120 at S524. At S2002 that follows, based on the response to the inquiry, whether or not the image analysis processing is completed is determined. Specifically, in a case where "status" described above is not "completed", the processing advances to S2003 and in a case where "status" is "completed", the processing advances to S2004. At S2003, the MFP 110 stands by for a predetermined time in order to wait for the completion of the image analysis processing and after the standby, performs the processing at S2001 again. At S2004, the MFP 110 acquires the drawing data generated in the image analysis processing and terminates this flow.

Explanation is returned to FIG. 5B. The MFP 110 having received the drawing data of the File name setting screen performs the file name setting processing for the scanned image of this time in cooperation with the MFP cooperative server 120 (S526).

<<File Name Setting Processing>>

Figure 21:
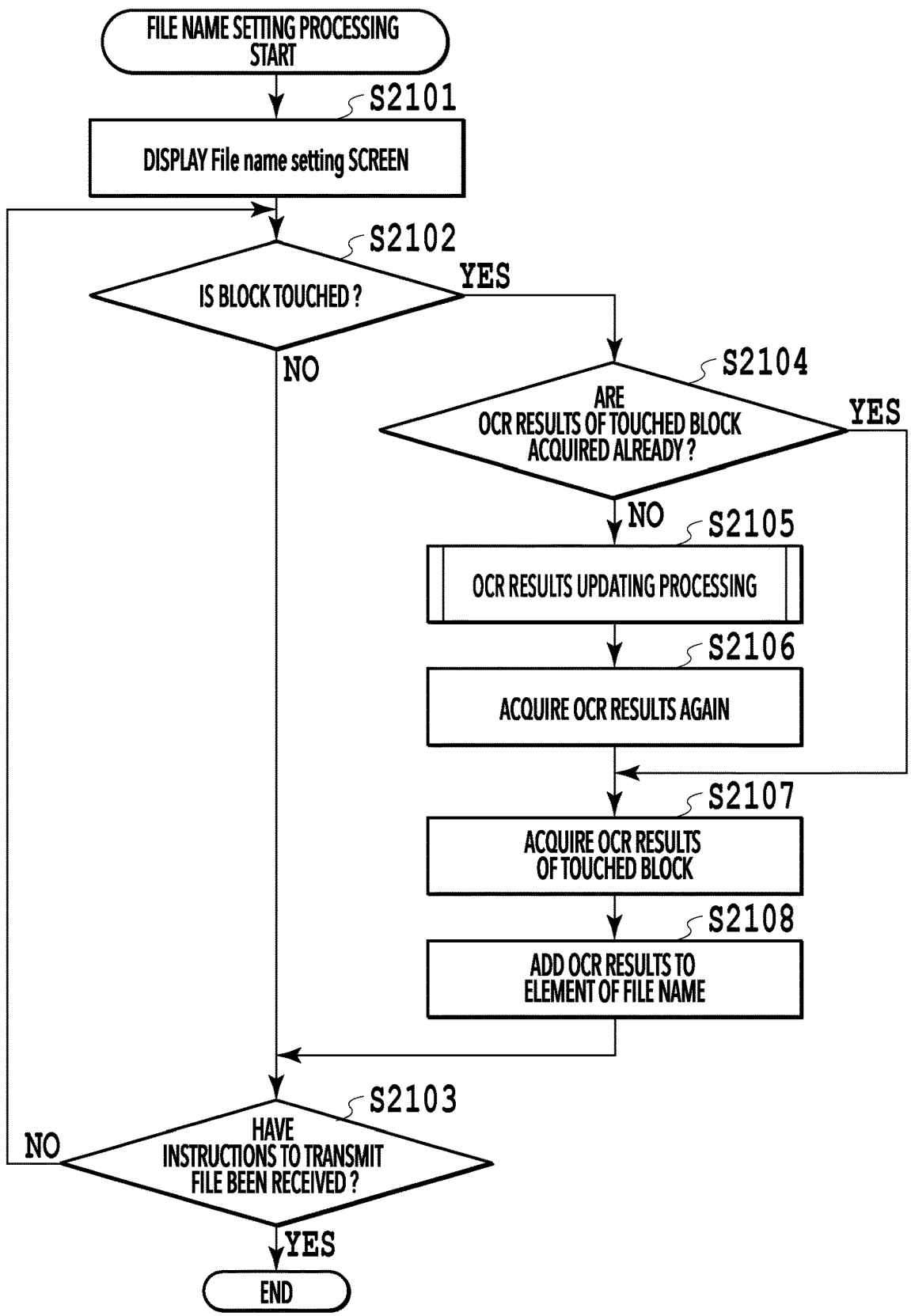
FIG. 21 is a flowchart showing details of file name setting processing.

FIG. 21 is a flowchart explaining a detailed procedure of the file name setting processing in the MFP 110. First, at S2101, the MFP 110 draws and displays the File name setting screen shown in FIG. 18 on the operation unit 220 based on the drawing data acquired at S525. At S2102 that follows, the MFP 110 determines whether or not an arbitrary text block within the preview area 1802 is touched by a user via the touch panel of the operation unit 220. Specifically, this determination is performed by a procedure below. First, in a case where the touch panel is touched by a user, the touched coordinates are acquired. Next, whether or not a text block that includes the acquired touched coordinates in its rectangular area exists among the text blocks configuring the OCR results (refer to Table 3 and FIG. 7) included in the drawing data is determined. In a case where the results of the determination indicate that the text block exists, it is determined that the text block is touched. In other cases, that is, in a case where the touch panel is not touched or in a case where the touched coordinates are not included in the rectangular area of any text block, it is determined that the text block is not touched. In a case where the results of the determination at S2202 indicate that any text block is not touched, the processing advances to S2103 and in a case where the touched text block exists, the processing advances to S2104.

At S2103, the MFP 110 determines whether or not the Transmit button 1807 is touched by a user. In a case where the results of the determination indicate that the Transmit button 1807 is not touched, the processing returns to S2102. On the other hand, in a case where the Transmit button 1807 is touched, this flowchart is terminated and the processing advances to the transmission of the file name setting request (S527).

At S2104, the MFP 110 determines whether or not the OCR results (recognized character string) of the touched text block are already acquired. This determination is performed by determining whether or not the recognized character string corresponding to the touched text block (the value of "Character string within area" in Table 3, or the value of "text" in FIG. 17) exists. In a case where the recognized character string corresponding to the touched block does not exits, the processing advances to S2105 and in a case where the recognized character string exits, the processing advances to S2107.

Figure 22:
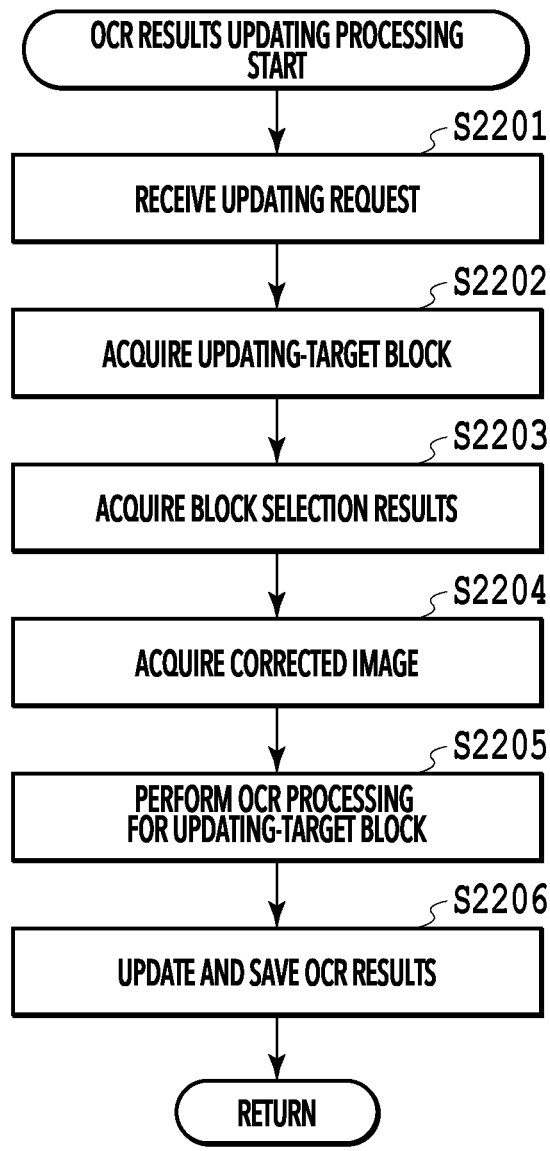
FIG. 22 is a flowchart showing details of OCR results updating processing.

At S2105, MFP 110 makes a request to update the OCR results to the MFP cooperative server 120. FIG. 22 is a flowchart explaining a detailed procedure of the OCR results updating processing in the MFP cooperative server 120. The series of processing shown in the flowchart in FIG. 22 is started with the request control unit 431 of the MFP cooperative server 120 receiving the updating request from the MFP 110 being taken as a trigger.

First, at S2201, the request control unit 431 receives the request to update the OCR results from the MFP 110. In this updating request, information of "processId" and "rect" of the block for which the OCR results are to be updated (block determined to be touched by a user by the MFP 110 at S2102) is included. The request control unit 431 having received the request to update the OCR results instructs the image processing unit 432 to perform processing to update the OCR results. In the execution instructions, the information of "processId" and "rect" of the OCR results updating-target block is included as in the request to update the OCR results received from the MFP 110.

At S2202 that follows, the image processing unit 432 acquires the information of "rect" of the updating target included in the updating request received by the request control unit 431 at S2201. Further, the image processing unit 432 acquires the block selection results at S2203 by using "processId" and acquires the corrected image data at S2204. Then, at S2205, the image processing unit 432 performs the OCR processing for the updating-target block by using the block selection results and the corrected image data acquired at S2202 and S2204. Then, at S2206, the image processing unit 432 instructs the data management unit 434 to save the recognized character string obtained by the OCR processing at S2205 as a new recognized character string corresponding to the updating-target block. Upon receipt of the instructions, the data management unit 434 saves the newly acquired recognized character string in association with the updating-target block. The above is the OCR results updating processing in the MFP cooperative server 120.

Explanation is returned to the flow in FIG. 21. In a case where the updating processing of the OCR results is completed, at S2106, the MFP 110 acquires the OCR results again from the MFP cooperative server 120. Then, at S2107, the MFP 110 acquires the recognized character string corresponding to the touched block among the OCR results acquired again. At S2108 that follows, the MFP 110 sets the recognized character string acquired at S2107 as the character string configuring the file name for the scanned image of this time and the processing advances to S2103.

The processing procedure having been explained so far with reference to the flows in FIG. 21 and FIG. 22 is explained by using a specific example. Here, it is assumed that the portion whose coordinates (x, y)=(1259, 343) in the preview image area 1802 on the File name setting screen 1800 is touched by a user (YES at S2102). The coordinates are included in the text block whose No. is "1" of the OCR results shown in Table 3, and therefore, it is determined that the portion is touched and the processing advances to S2104. "Estimate form" that is the recognized character string (Character string within area) of the block whose No. is "1" is already acquired (YES at S2104), and therefore, following this, the processing at S2107 and S2108 is performed. Then, it is assumed that the Transmit button 1807 is not touched at S2103 that follows (NO at S2103) and the touch to coordinates (x, y)=(1974, 470) is detected at S2102 to which the processing has returned. Here, the coordinates (x, y)=(1974, 470) are included in the text block whose No. is "4" among the OCR results shown in Table 3, and therefore, the results at S2102 are YES and the processing advances to S2104. For the text block whose No. is "4", the recognized character string (Character string within area) is not acquired yet, and therefore, the results at S2104 are NO and the processing at S2105 and S2106 is performed. By both the pieces of processing, the OCR results to which "R12-3456" as the recognized character string for the text block whose No. is "4" is added are acquired again. By the processing procedure as described above, the display contents on the File name setting screen change into the state as shown in FIG. 23. In a case where the Transmit button 1807 is touched by a user in that state, the processing advances to the transmission of the file name setting request (S527).

Explanation is returned to the flow in FIG. 5B. In a case where the file name setting processing is completed, the MFP 110 requests the request control unit 431 of the MFP cooperative server 120 to use the file name set at S526 in a case where the scanned image data of the computerization-target business form is saved in the storage server 130. This request is called "file name setting request". In the file name setting request, information including "processId" and the text block corresponding to the character string used for the file name and the recognized character string thereof as shown in FIG. 24 is included.

Upon receipt of the file name setting request transmitted by the MFP 110 (S528), the request control unit 431 having received the file name setting request instructs the image processing unit 432 to perform the learning processing of the file name setting (S529). In the learning instructions, the same data as that in the file name setting request received by the request control unit 431 at S528 is included. Upon receipt of the instructions to learn the file name setting (S530), the image processing unit 432 performs the learning processing of the file name setting (S531).

<<Learning Processing of File Name Setting>>

Figure 25:
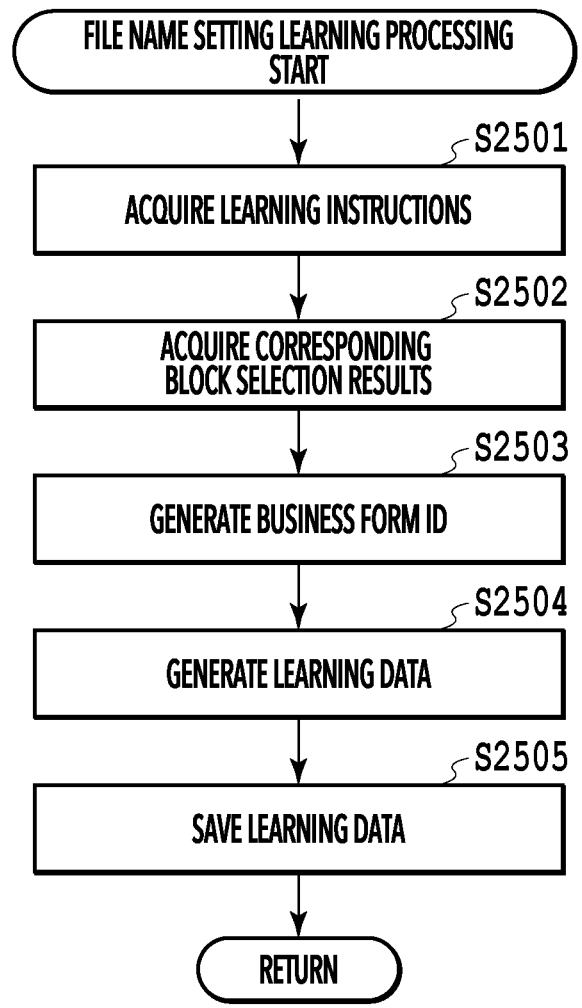
FIG. 25 is a flowchart showing details of file name setting learning processing.

FIG. 25 is a flowchart explaining a detailed procedure of the learning processing of the file name setting performed by the image processing unit 432. First, at S2501, the learning instructions from the request control unit 431 are acquired, which are received at S530. At S2502 that follows, the information included in the learning instructions acquired at S2501, specifically, the information on the block selection results associated with "processId" and the text block used for the file name is downloaded from the data management unit 434. At S2503 that follows, "formId" for uniquely indicating the scanned image of the computerization-target business form is generated in a UUID format. At S2504 that follows, the block selection results and the information on the text block used as the file name are merged and the learning data associated with "formId" described above is generated. FIG. 26 shows an example of the learning data. At S2505 that follows, the learning data generated at S2504 is uploaded to the data management unit 434. In a case where this upload is completed, this flow is terminated.

Explanation is returned to the flow in FIG. 5B. In a case where the learning processing of the file name setting is completed, the image processing unit 432 notifies the request control unit 431 that the learning processing of the file name setting is completed (S532). Upon receipt of the completion notification of the learning processing (S533), the request control unit 431 instructs the storage server access unit 433 to perform file transmission (S534). In the file transmission instructions, "processId" and the file name set at S526 are included. The file name is a kind of information that is set as a property (attribute) relating to the scanned image data. Upon receipt of the file transmission instructions (S535), the storage server access unit 433 first acquires the transmission-target corrected image data by "processId" included in the file transmission instructions from the data management unit 434. Then, the storage server access unit 433 attaches the file name included in the file transmission instructions to the corrected image data. Next, the storage server access unit 433 transmits a file to the storage server 130 (S536). The storage server 130 having received the file saves the file (S537). Then, the storage server access unit 433 notifies the request control unit 431 that the file transmission is completed (S538). Upon receipt of the completion notification of the file transmission (S539), the request control unit 431 similarly notifies the MFP 110 that the file transmission is completed (S540). In a case where the MFP 110 receives the completion notification of the file transmission (S541), the series of processing from the document being filed in the MFP 110 until the file being saved in the storage server 130 is terminated.

Modification Example 1

Next, an aspect is explained as a modification example of the first embodiment in which the variation in responsiveness to a user is suppressed by switching the OCR processing-target blocks in accordance with the load state of the processing in the MFP cooperative server 120.

Figure 27:
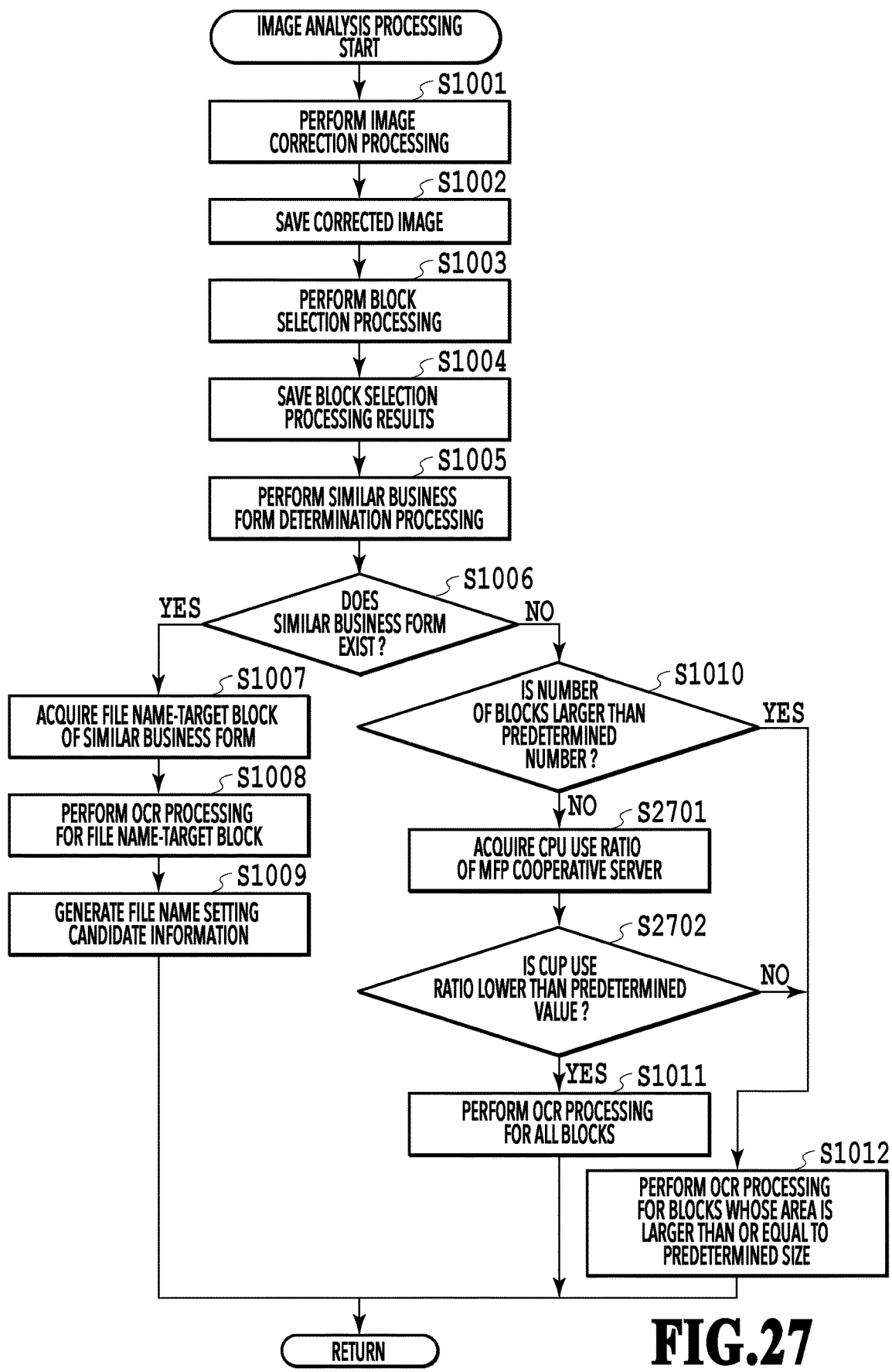
FIG. 27 is a flowchart showing details of image analysis processing according to a modification example 1.

FIG. 27 is a flowchart showing a detailed procedure of the image analysis processing (S516) performed by the image processing unit 432 according to the present modification example. To the steps in common to those in the flowchart in FIG. 10 described previously, the same symbols are attached and explanation of the steps is omitted and in the following, only different points are explained.

In the case where the determination results at S1010 are NO, that is, the number of blocks included in the scanned image is less than or equal to the predetermined number, in this flow, the processing advances to S2701.

At S2701, the use ratio of the CPU 311 of the MFP cooperative server 120 is acquired from the request control unit 431. At S2702 that follows, whether or not the CPU use ratio acquired at S2701 is lower than a predetermined threshold value is determined. Here, it is sufficient to determine the predetermined threshold value in advance in accordance with the performance of the CPU that is mounted on the MFP cooperative server 120, the number of MFPs to be connected to the MFP cooperative server 120, and the like. In a case where the determination results indicate that the CPU use ratio is lower than a predetermined level, the processing advances to S1011 and in a case where the CPU use ratio is higher than or equal to the predetermined level, the processing advances to S1012.

By doing as described above, it is possible to determine the OCR processing-target block by taking into consideration the information relating to the processing load situation of the system that may generally affect the processing time, in addition to the information obtained as the results of the image analysis processing, such as the number of text blocks and the text block size. As a result of that, it is possible to suppress the deterioration of responsiveness to a user depending on the load state of the system.

In the present modification example, as the index of the processing load situation of the MFP cooperative server 120, the use ratio of the CPU 311 is used, but the index is not limited to this and any index that can generally be an index of the load state of the system may be used.

Modification Example 2

Next, an aspect is explained as a further modification example of the first embodiment in which the responsiveness experienced by a user is improved by reducing the response time for each user operation by storing the completion state of the OCR processing in the MFP cooperative server 120.

Figure 28:
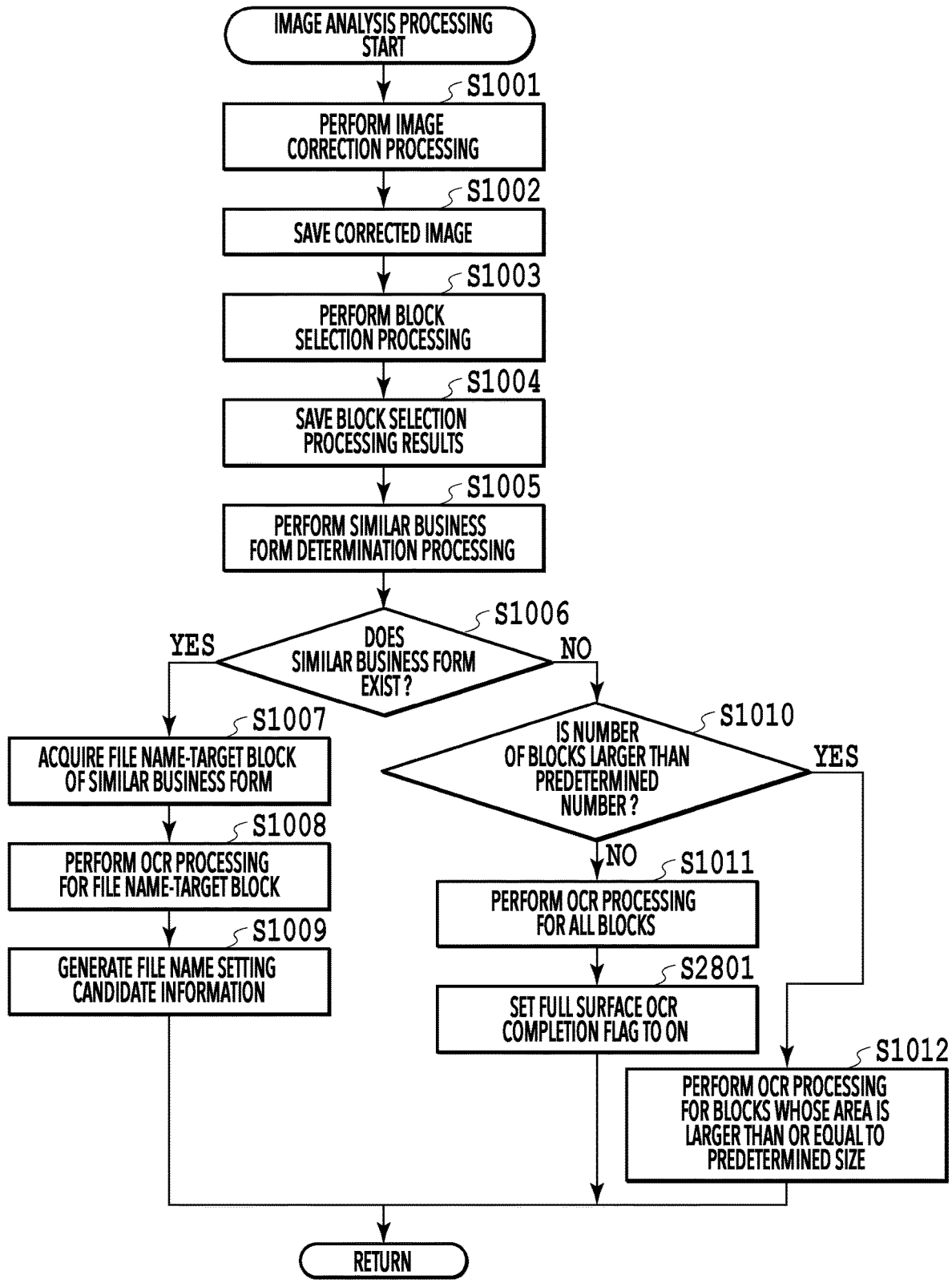
FIG. 28 is a flowchart showing details of image analysis processing according to a modification example 2.

FIG. 28 is a flowchart showing a detailed procedure of the image analysis processing (S516) performed by the image processing unit 432 according to the present modification example. To the steps in common to those in the flowchart in FIG. 10 described previously, the same symbols are attached and explanation of the steps is omitted and in the following, only different points are explained.

In a case where the OCR processing is completed for all the text blocks extracted by the block selection processing for the analysis-target image at S1011, the processing advances to S2801 in the present modification example.

At S2801, the image processing unit 432 stores information indicating that the OCR processing has already been performed for all the text blocks extracted by the block selection processing. In the present modification example, for the OCR processing results obtained at S1011, a value of a flag (full surface OCR completion flag) indicating that the OCR processing is completed for the full surface of the analysis-target image is set to ON.

FIG. 29 is a diagram showing an example of OCR processing results including a full surface OCR completion flag 2901 indicated by attribute "isFullOcrCompleted". Here as the attribute value thereof, "true" corresponding to ON is set and it is indicated that the OCR processing is completed for the full surface of the analysis-target image.

Figure 30:
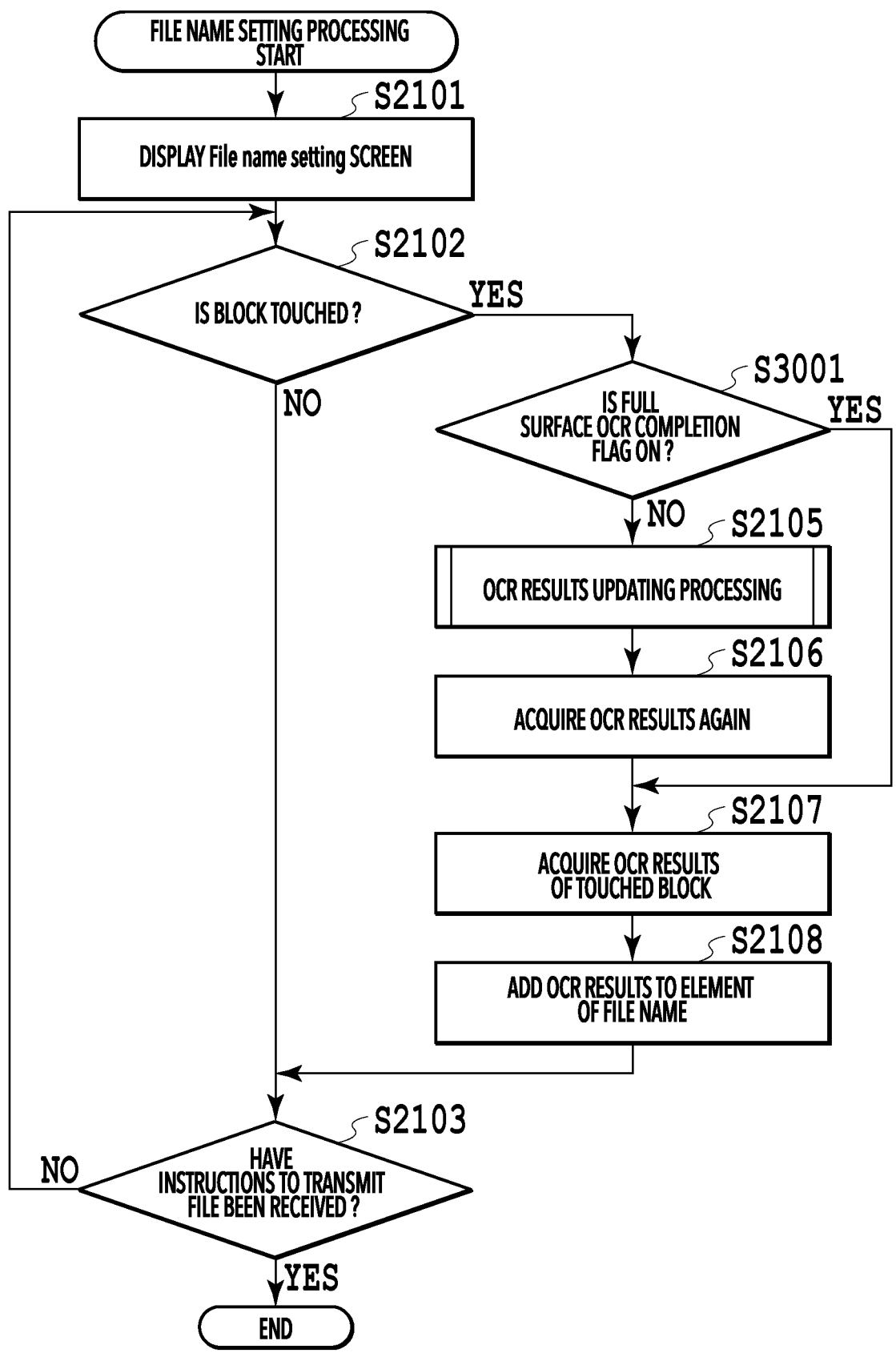
FIG. 30 is a flowchart showing details of file name setting processing according to the modification example 2.

FIG. 30 is a flowchart showing a detailed procedure of the file name setting processing (S526) in the present modification example. To the steps in common to those in the flowchart in FIG. 21 described previously, the same symbols are attached and explanation of the steps is omitted and in the following, only different points are explained.

In a case where the determination results at S2102 are YES, that is, in a case where an arbitrary text block within the preview area 1802 is touched by a user, the processing advances to S3001 in this flow.

At S3001, the image processing unit 432 determines whether or not the attribute value of the full surface OCR completion flag included in the OCR processing results is "true".

In a case where the determination results indicate that the attribute value is "true" (in a case of YES at S3001), the processing advances to S2107. On the other hand, in a case where the attribute value is "false", or in a case where the full surface OCR completion flag 2901, such as "isFullOcrCompleted", does not exist in the OCR processing results, the processing advances to S2105.

Figure 31:
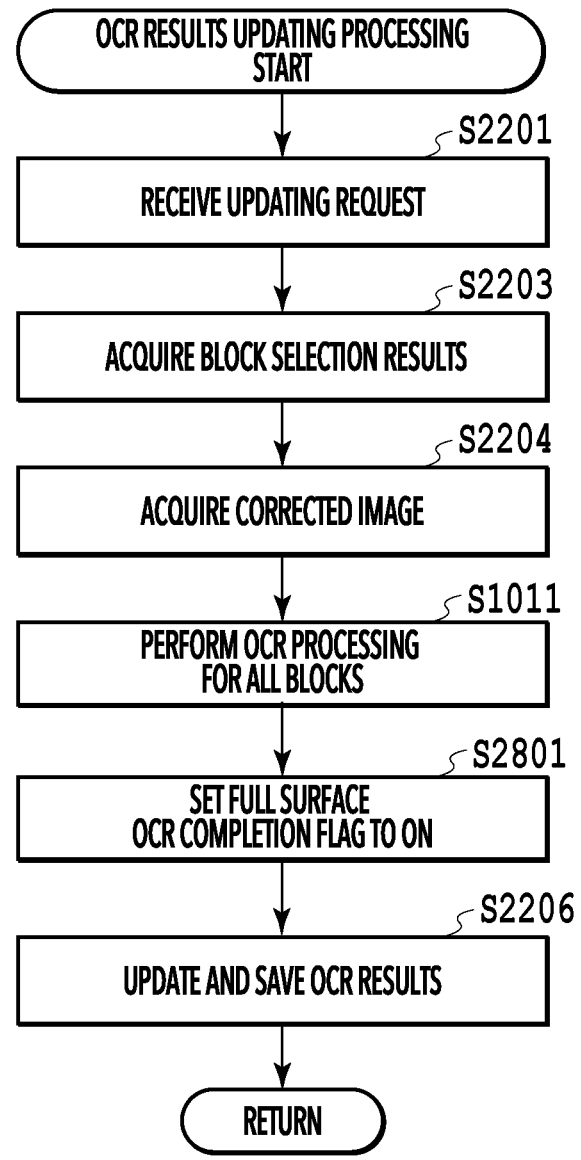
FIG. 31 is a flowchart showing details of OCR results updating processing according to the modification example 2.

FIG. 31 is a flowchart showing a detailed procedure of the OCR results updating processing (S2105) in the present modification example. To the steps in common to those in the flowchart in FIG. 22 described previously, the same symbols are attached and explanation of the steps is omitted and in the following, only different points are explained.

After each piece of processing at S2201, S2203, and S2204 is performed in order, in this flow, the processing at S1011 in the flowchart in FIG. 10 is performed. That is, the OCR processing is performed by the image processing unit 432 for all the text blocks extracted by the block selection processing for the analysis-target image.

Following the above, the flag setting processing at S2801 described previously is performed and information indicating that the OCR processing is completed for the full surface of the analysis-target image is added to the OCR processing results obtained by the processing at S1011.

By storing the completion state of the OCR processing for the analysis-target image as described above, it is possible to suppress the deterioration of responsiveness experienced by a user resulting from the overhead of the OCR processing being imposed each time a user selects a text block for which OCR has not been performed yet.

As above, according to the present embodiment, even in a case where a file name was not attached to a similar document in the past, it is possible to determine a text block that is taken as a target for which the OCR processing is to be performed in accordance with the number of text blocks included in the scanned image of this time. Due to this, it is possible to reduce the time required for the OCR processing, which is generally in proportion to the number of text blocks, irrespective of the number of text blocks included in the analysis-target image, and further, it is also possible to suppress the time required for generation of drawing data of the File name setting screen. Furthermore, even in a case where the number of text blocks included in the analysis-target image is large, it is possible to perform in advance the OCR processing only for the text blocks that are known generally as those likely to be attached as a file name and whose size is larger than or equal to a predetermined size. Because of this, it is possible to improve responsiveness compared to the method in which the OCR processing is performed for the first time in a case where a user sets a file name.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even in a case where a similar document was not computerized in the past, it is possible to perform the OCR processing only for the text blocks of the requisite minimum. As a result of that, it is possible to reduce the time required for the OCR processing, and therefore, convenience of a user is further improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-007505, filed Jan. 21, 2020, and No. 2020-074626, filed Apr. 20, 2020, which are hereby incorporated by reference wherein in their entirety.

What is claimed is:

1. An image processing system that computerizes a document, comprising:
a memory that stores a program; and
a processor that executes the program to perform:
   detecting text blocks from a scanned image of a target document;
   character recognition processing for at least one of the detected text blocks; and setting a property relating to the scanned image by using a character string recognized by the character recognition processing, wherein in a case where a document similar to the target document does not exist among computerized documents for which the computerization was performed in the past, the character recognition processing is performed for text blocks whose size is larger than or equal to a predetermined size among the detected text blocks.

2. The image processing system according to claim 1, wherein in a case where a document similar to the target document does not exist among the computerized documents and a number of the detected text blocks is larger than a predetermined number, the character recognition processing is performed for text blocks whose size is larger than or equal to a predetermined size among the detected text blocks.

3. The image processing system according to claim 1, wherein the processor executes the program to further perform:
acquiring information indicating a load state in the image processing system and
in a case where a document similar to the target document does not exist among the computerized documents and the acquired information indicates a state of a load higher than or equal to a predetermined level, the character recognition processing is performed for text blocks whose size is larger than or equal to a predetermined size among the detected text blocks.

4. The image processing system according to claim 1, wherein in a case where a document similar to the target document does not exist among the computerized documents and a number of the detected text blocks is less than or equal to a predetermined number, the character recognition processing is performed for all of the detected text blocks.

5. The image processing system according to claim 4, wherein the processor executes the program to further perform:
storing information indicating that the character recognition processing has been performed for all of the detected text blocks.

6. The image processing system according to claim 1, wherein the processor executes the program to further perform:
learning to associate, for the computerized document, a text block corresponding to a character string used as a property of a scanned image of the computerized document and results of the detecting with each other; and determining whether or not a document similar to the target document exists among the computerized documents by using learning data obtained by the learning.

7. The image processing system according to claim 1, wherein the property is a file name that is attached in a case where the scanned image is computerized.

8. A control method of an image processing system that computerizes a document, the control method comprising the steps of:

detecting text blocks from a scanned image of a target document;
performing character recognition processing for at least one of the detected text blocks; and
setting a property relating to the scanned image by using a character string recognized by the character recognition processing, wherein
in a case where a document similar to the target document does not exist among computerized documents for which the computerization was performed in the past, the character recognition processing is performed for text blocks whose size is larger than or equal to a predetermined size among the detected text blocks.

9. A non-transitory computer readable storage medium storing a program for causing a computer to perform a control method of an image processing system that computerizes a document, the control method comprising the steps of:

detecting text blocks from a scanned image of a target document;
performing character recognition processing for at least one of the detected text block; and
setting a property relating to the scanned image by using a character string recognized by the character recognition processing, wherein
in a case where a document similar to the target document does not exist among computerized documents for which the computerization was performed in the past, the character recognition processing is performed for text blocks whose size is larger than or equal to a predetermined size among the detected text blocks.

10. The image processing system according to claim 1, wherein, in a case where a past document similar to the target document exists among the computerized documents for which the computerization was performed in the past, the processor executes the program to perform the character recognition processing for text blocks of the target document which correspond to text blocks of character strings that that were set as a file name of the past document similar to the target document.

* * * * *